United States Patent
Kim et al.

(10) Patent No.: US 10,713,419 B2
(45) Date of Patent: Jul. 14, 2020

(54) MOBILE TERMINAL AND CONTROL METHOD THEREOF

(71) Applicant: LG Electronics Inc., Seoul (KR)

(72) Inventors: Namki Kim, Seoul (KR); Sanghyun Eim, Seoul (KR); Yunjueng Mhun, Seoul (KR); Choonjae Lee, Seoul (KR); Jiyen Son, Seoul (KR); Joohee Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 505 days.

(21) Appl. No.: 14/142,658

(22) Filed: Dec. 27, 2013

(65) Prior Publication Data

US 2014/0281908 A1    Sep. 18, 2014

(30) Foreign Application Priority Data

Mar. 15, 2013    (KR) .......................... 10-2013-0028292

(51) Int. Cl.
*G06F 3/0485* (2013.01)
*G06F 40/14* (2020.01)
(Continued)

(52) U.S. Cl.
CPC ............ *G06F 40/14* (2020.01); *G06F 3/0483* (2013.01); *G06F 3/0485* (2013.01); *G06F 3/0488* (2013.01)

(58) Field of Classification Search
CPC .. G06F 3/0482; G06F 17/212; G06F 17/2247; G06F 17/30274; G06F 17/30861;
(Continued)

(56) References Cited

U.S. PATENT DOCUMENTS

| | | | | |
|---|---|---|---|---|
| 8,130,075 B1 * | 3/2012 | Hingole | ................ | G06F 3/0481 340/5.55 |
| 8,375,334 B2 * | 2/2013 | Nakano | ................ | G06F 1/1626 715/810 |

(Continued)

FOREIGN PATENT DOCUMENTS

| | | |
|---|---|---|
| KR | 20100030968 | 3/2010 |
| KR | 20130025301 | 3/2013 |

OTHER PUBLICATIONS

Korean Intellectual Property Office Application No. 10-2013-0028292, Office Action dated May 24, 2019, 6 pages.

*Primary Examiner* — Wilson W Tsui
(74) *Attorney, Agent, or Firm* — Lee Hong Degerman Kang & Waimey

(57) ABSTRACT

A mobile terminal and a method for using the same. The mobile terminal includes a display configured to display first screen information corresponding to at least a portion of a first page having a predetermined length, a sensor configured to detect a touch received on the display, and a controller configured to control the display to cease displaying at least a portion of the first screen information when the received touch corresponds to a predetermined scheme for displaying another portion of the first screen information, display the another portion of the first screen information in response to the received touch, and display at least a portion of second screen information corresponding to a region beyond an edge of the first page in response to the received touch when the displayed at least a portion of the first screen information corresponds to an edge region of the first page.

16 Claims, 32 Drawing Sheets

(51) Int. Cl.
*G06F 3/0488* (2013.01)
*G06F 3/0483* (2013.01)

(58) Field of Classification Search
CPC ......... G06F 17/30873; G06F 17/30899; G06F 17/30905; G06F 3/0485; G06F 2203/04803; G06F 2203/04808; G06F 3/048
See application file for complete search history.

(56) References Cited

U.S. PATENT DOCUMENTS

| | | | | |
|---|---|---|---|---|
| 8,683,385 B2* | 3/2014 | Park | ................... | G06F 3/0482 715/784 |
| 9,037,975 B1* | 5/2015 | Taylor | ............... | G06F 17/30905 715/733 |
| 9,285,958 B1* | 3/2016 | Hill | ................... | G06F 3/0483 |
| 2006/0020904 A1* | 1/2006 | Aaltonen | ................ | G06F 3/048 715/850 |
| 2006/0101330 A1* | 5/2006 | Godley | ................ | G06F 3/0482 715/273 |
| 2006/0230356 A1* | 10/2006 | Sauve | ................... | G06F 3/0481 715/777 |
| 2007/0132789 A1* | 6/2007 | Ording | ................. | G06F 3/0485 345/684 |
| 2007/0162864 A1* | 7/2007 | Masselle | ............... | G06F 3/0483 715/765 |
| 2008/0055269 A1* | 3/2008 | Lemay | .................. | G06F 3/0482 345/173 |
| 2008/0189645 A1* | 8/2008 | Kapanen | ............... | G06F 3/0481 715/777 |
| 2009/0002335 A1* | 1/2009 | Chaudhri | ............ | G06F 3/04815 345/173 |
| 2009/0070711 A1* | 3/2009 | Kwak | ................... | G06F 3/0485 715/829 |
| 2010/0222112 A1* | 9/2010 | Han | ................... | G06F 3/04883 455/566 |
| 2010/0299599 A1* | 11/2010 | Shin | ..................... | G06F 3/0482 715/702 |
| 2011/0055752 A1 | 3/2011 | Rubinstein et al. | | |
| 2012/0024808 A1 | 2/2012 | Jackson et al. | | |
| 2012/0052921 A1* | 3/2012 | Lim | ................... | G06F 3/04883 455/566 |
| 2012/0272181 A1* | 10/2012 | Rogers | .................. | G06F 3/0482 715/784 |
| 2013/0036380 A1* | 2/2013 | Symons | .............. | G06F 3/04817 715/804 |
| 2013/0218987 A1* | 8/2013 | Chudge | ............... | H04L 12/1813 709/206 |

* cited by examiner

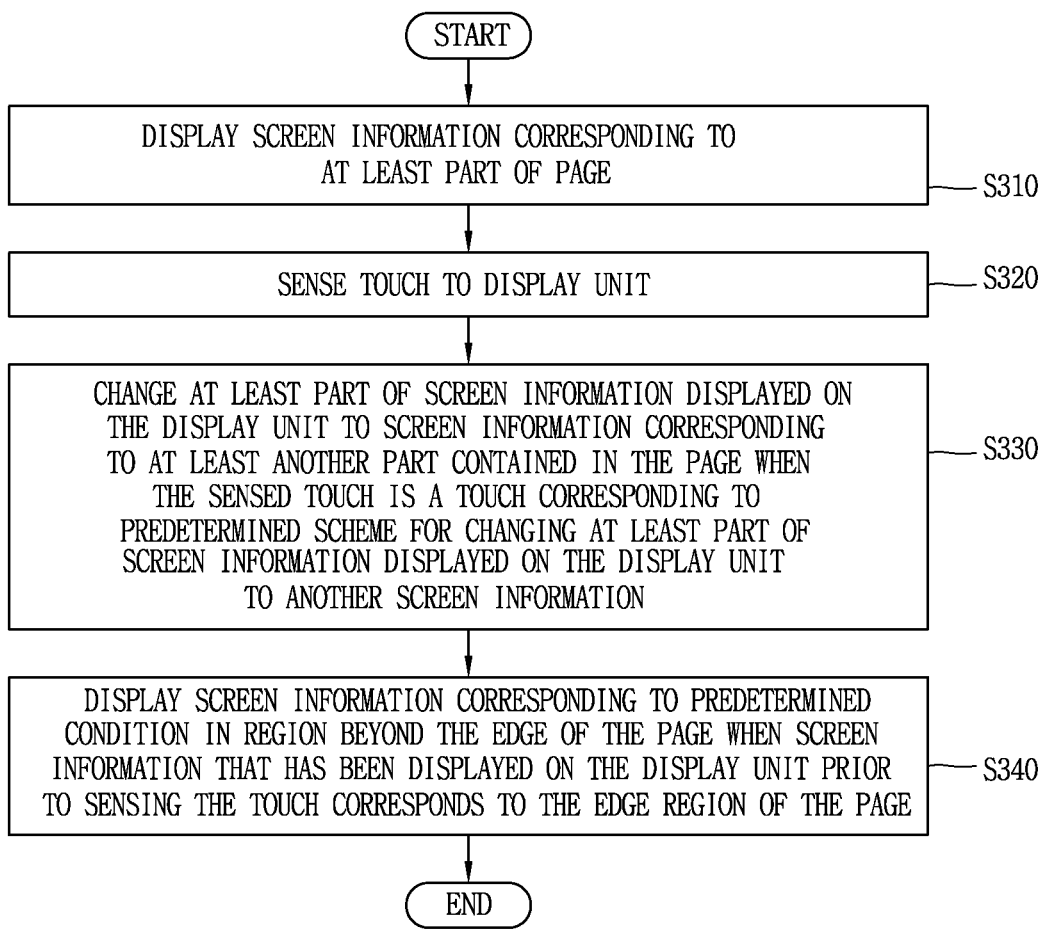

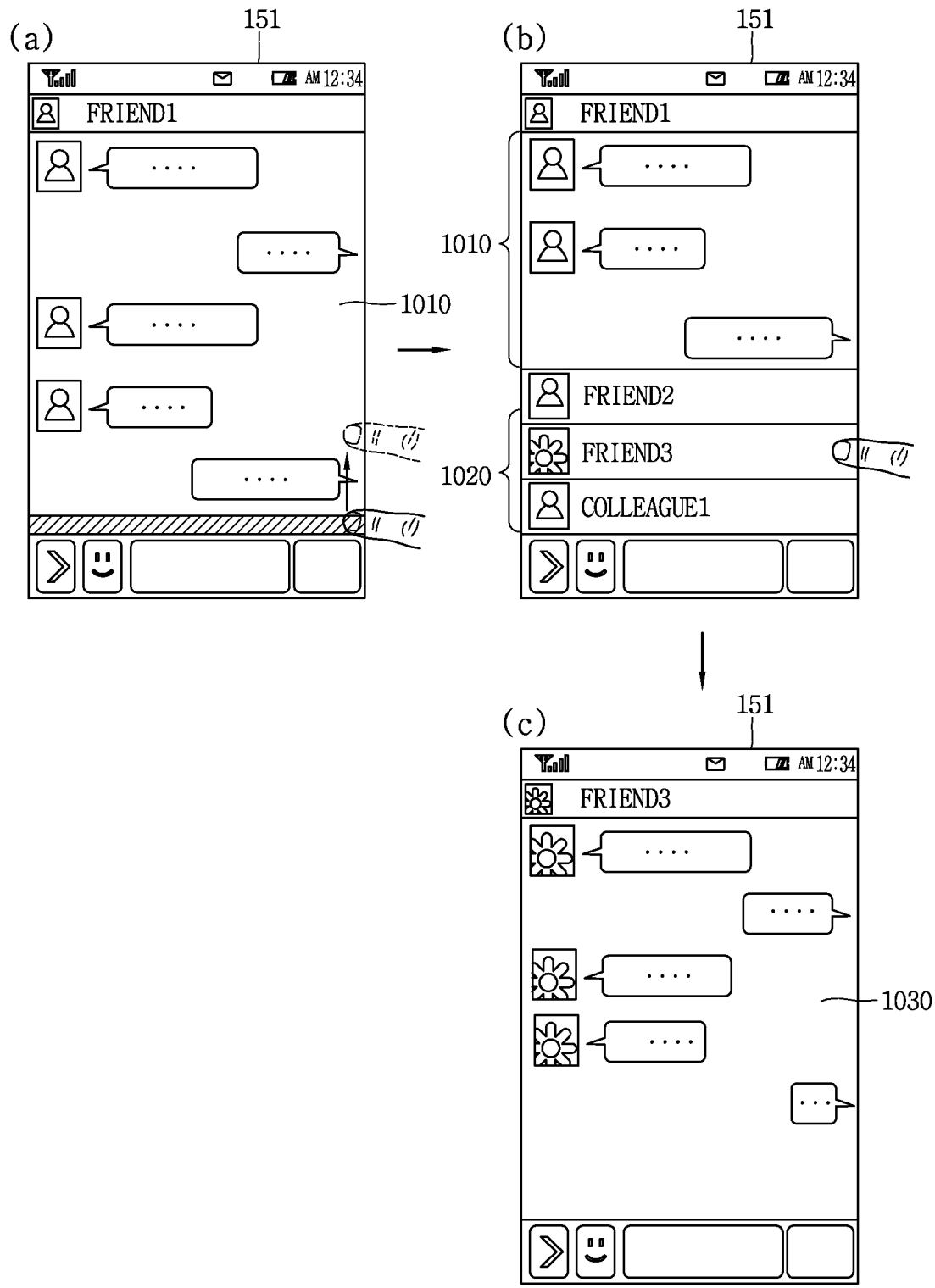

MOBILE TERMINAL AND CONTROL METHOD THEREOF

RELATED APPLICATION

Pursuant to 35 U.S.C. § 119(a), this application claims the benefit of earlier filing date and right of priority to Korean Application No. 10-2013-0028292, filed on Mar. 15, 2013, the contents of which is incorporated by reference herein in its entirety.

BACKGROUND OF THE INVENTION

1. Field of the Invention

The present disclosure relates to a mobile terminal configured to enable a touch input and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

In such a terminal, when the user wants to move to another page while using any one page, it may cause a burden that the user should terminate the output of the any one page, and then select the another page.

SUMMARY OF THE INVENTION

An objective of the present disclosure is to provide a mobile terminal capable of using another page different from a page currently being used in an intuitive and convenient manner and a control method thereof.

In order to accomplish the foregoing objective, a mobile terminal according to an embodiment of the present disclosure may include a display unit formed to display screen information corresponding to at least part of a page having a predetermined length, a sensing unit formed to sense a touch to the display unit, and a controller configured to change at least part of the screen information displayed on the display unit to screen information corresponding to at least another part contained in the page when the touch is a touch corresponding to a predetermined scheme for changing at least part of the screen information displayed on the display unit to another screen information, wherein when screen information that has been displayed on the display unit prior to sensing the touch corresponds to an edge region of the page, the controller displays at least part of the screen information corresponding to the predetermined condition in a region beyond the edge of the page in response to the touch.

According to an embodiment, the screen information corresponding to the predetermined condition may correspond to at least another page associated with the page.

According to an embodiment, at least part of the screen information corresponding to the predetermined condition may be displayed in the form of a list containing at least one item corresponding to the at least another page, respectively, and the at least one item may be displayed in a consecutive manner to the edge of the page in a region beyond the edge of the page.

According to an embodiment, the controller may control the display unit such that the number of items displayed in a consecutive manner to the edge of the page varies according to a length to which the touch is applied, and gradually move at least one item displayed on the display unit based on a touch consecutive to the touch.

According to an embodiment when the at least another page associated with the page is a plural number, and at least one item corresponding to part of the plurality of another pages is displayed on the display unit, the controller may display at least one item corresponding to the remaining pages of the plurality of another pages in a consecutive manner to an item previously displayed on the display unit based on the consecutive touch.

According to an embodiment, when a touch consecutive to the touch is applied in a state that at least one item corresponding to the at least another page associated with the page are all displayed, the controller may display at least part of the screen information that has been displayed on the display unit prior to applying the touch in a region beyond the edge of an item located at the uppermost end of the at least one item.

According to an embodiment, screen information that has been displayed on the display unit prior to applying the touch may be circulatively moved by placing the at least one item therebetween based on a touch consecutive to the touch.

According to an embodiment, the controller may control the display unit such that the display size of the at least one item varies according to a location displayed with the at least one item on the display unit.

According to an embodiment, the controller may control the display unit such that an item most adjacent to the edge of the page among the at least one item is displayed larger than the other items.

According to an embodiment, the controller may control the display unit such that an item located at a predetermined reference line of the display unit among the at least one item is displayed in the largest size.

According to an embodiment, when a touch with a pinch-in or pinch-out gesture is applied to any one of the at least one item, the controller may change the display size of the at least one item, and adjust the size of a region displayed with screen information corresponding to the page in connection with the display size of the at least one item being changed.

According to an embodiment, the controller may terminate the display of the screen information corresponding to the predetermined condition in response to the touch being released, and display screen information that has been displayed on the display unit again prior to sensing the touch.

According to an embodiment, the controller may control the display unit such that a location displayed with screen information corresponding to the predetermined condition varies according to the touch length of the touch, and when the screen information corresponding to the predetermined condition is displayed to correspond to a virtual reference line located on the display unit, the controller may continuously display the screen information corresponding to the predetermined condition on the display unit even when the touch is released.

According to an embodiment, when the screen information corresponding to the predetermined condition reaches a virtual reference line located on the display unit, the controller may output a notification image for notifying that the screen information corresponding to the predetermined condition is fixed through a sound or vibration.

According to an embodiment, the controller may control the display unit such that a location displayed with screen information corresponding to the predetermined condition varies according to the touch length of the touch, and when the screen information corresponding to the predetermined condition is displayed up to a virtual reference line located on the display unit along the touch, the controller may switch screen information that has been displayed on the display unit prior to sensing the touch to the screen information corresponding to the predetermined condition.

According to an embodiment, when an event is received in a state that screen information corresponding to the predetermined condition is displayed, the controller may change at least part of the screen information corresponding to the predetermined condition to screen information corresponding to the received event.

According to an embodiment, the page may be a webpage, and the screen information corresponding to the predetermined condition may be at least another webpage that has been displayed on the display unit prior to displaying the webpage.

A mobile terminal according to an embodiment of the present disclosure may include a display unit formed to display screen information corresponding to at least part of a page having a predetermined length, a sensing unit formed to sense a touch to the display unit, and a controller configured to change at least part of the screen information displayed on the display unit to screen information corresponding to at least another part contained in the page when the touch is a touch corresponding to a predetermined scheme for changing at least part of the screen information displayed on the display unit to another screen information, wherein when screen information that has been displayed on the display unit prior to sensing the touch corresponds to an edge region of the page, the controller displays at least part of screen information corresponding to another page for performing a function similar to the page in a region beyond the edge of the page in response to the touch.

A control method of a mobile terminal according to an embodiment of the present disclosure may include displaying screen information corresponding to at least part of a page having a predetermined length, sensing a touch to the display unit, and changing at least part of the screen information displayed on the display unit to screen information corresponding to at least another part contained in the page when the touch is a touch corresponding to a predetermined scheme for changing at least part of the screen information displayed on the display unit to another screen information, wherein when screen information that has been displayed on the display unit prior to sensing the touch corresponds to an edge region of the page, at least part of the screen information corresponding to a predetermined condition is displayed in a region beyond the edge of the page in response to the touch in the step of changing the screen information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart for explaining a method of controlling a mobile terminal according to an embodiment of the present disclosure;

FIGS. 9A, 9B, 9C, 10A, 10B, 11, 12, 13, 14 and 15 are conceptual views for describing a specific embodiment in a mobile terminal according to an embodiment of the present disclosure;

DETAILED DESCRIPTION OF THE INVENTION

Figure 1:
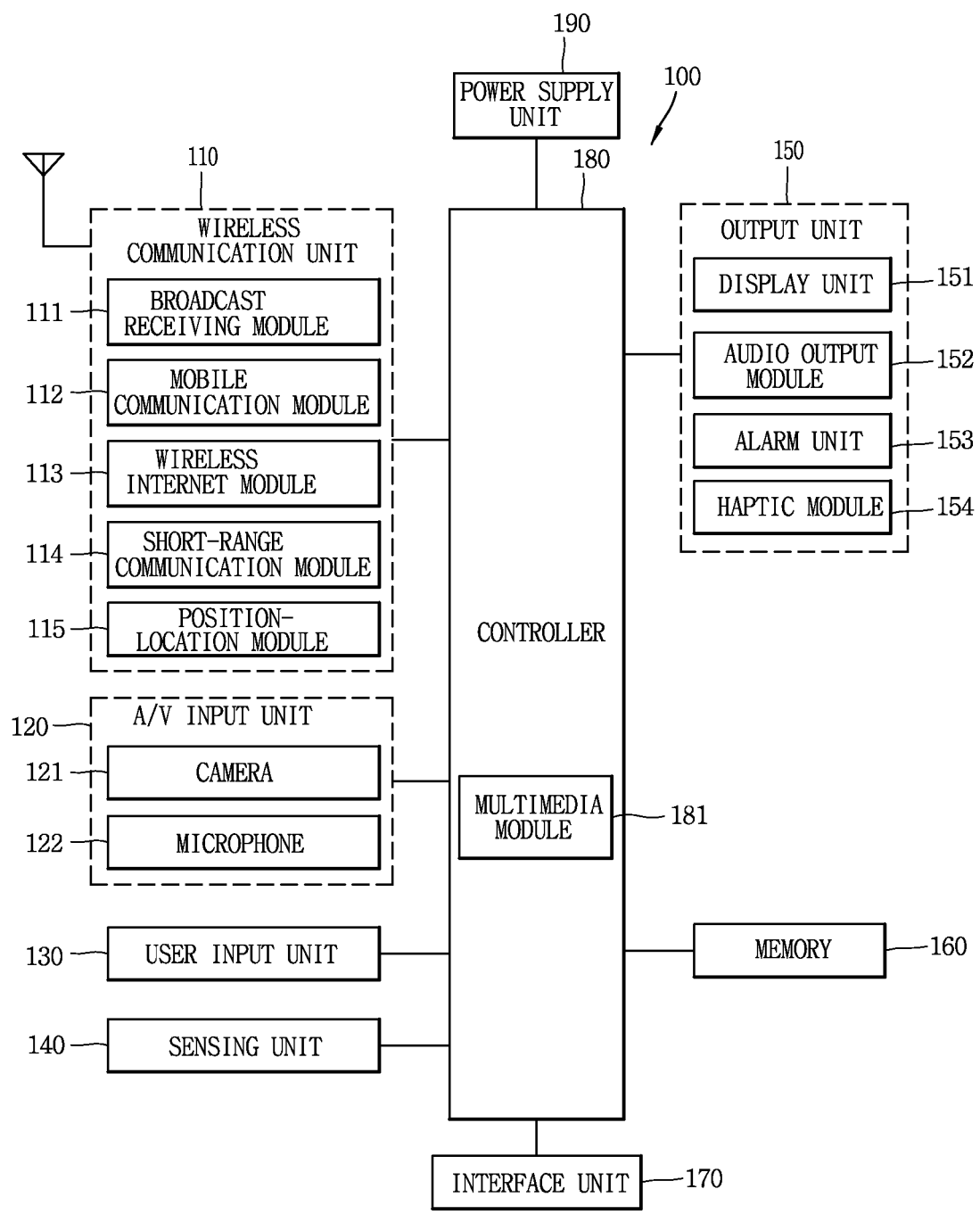
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the NV (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The sensing unit 140 may include a proximity sensor 141, a stereoscopic touch sensing unit 142, an ultrasonic sensing unit 143 and a camera sensing unit 144. The sensing unit 140 may be configured with a three-dimensional sensor for detecting the location of an object (hereinafter, referred to as a "sensing object") that exists and moves in a three-dimensional space. Here, the sensing object may be part (finger) of the user's body, an accessory device and the like.

The output unit 150 is configured to generate an output associated with visual sense, auditory sense or tactile sense, and may include a display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via the interface unit 170.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Hereinafter, a mobile terminal according to an embodiment of the present disclosure as illustrated above in FIG. 1 or a mobile terminal disposed with the constituent elements of the mobile terminal or the structure of a mobile terminal will be described.

Figure 2A:
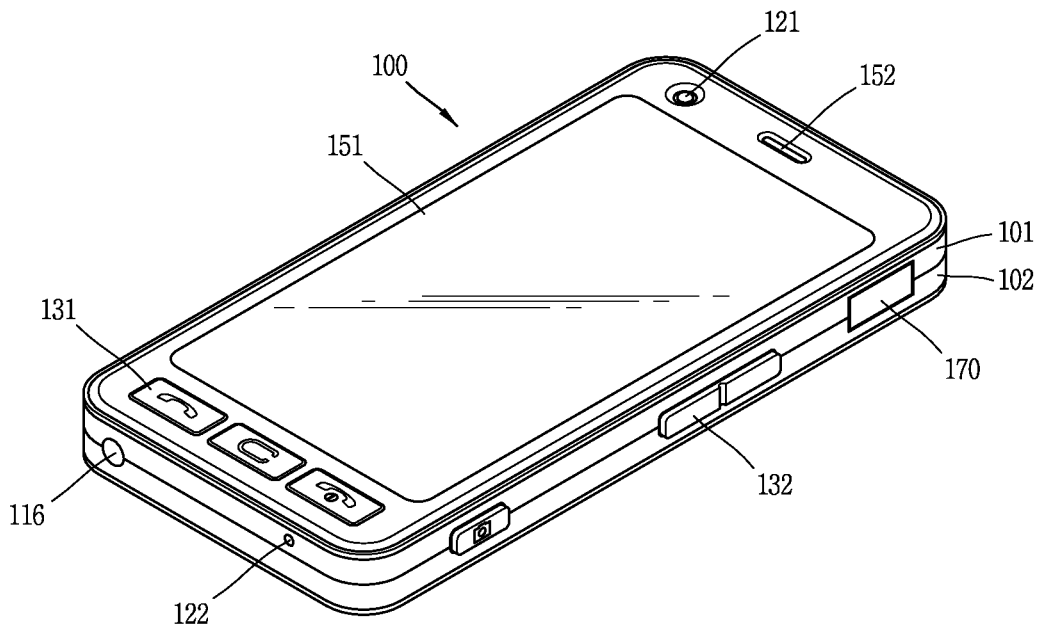
FIG. 2A is a front perspective view illustrating an example of a mobile terminal according to an embodiment of the present disclosure.
Figure 2B:
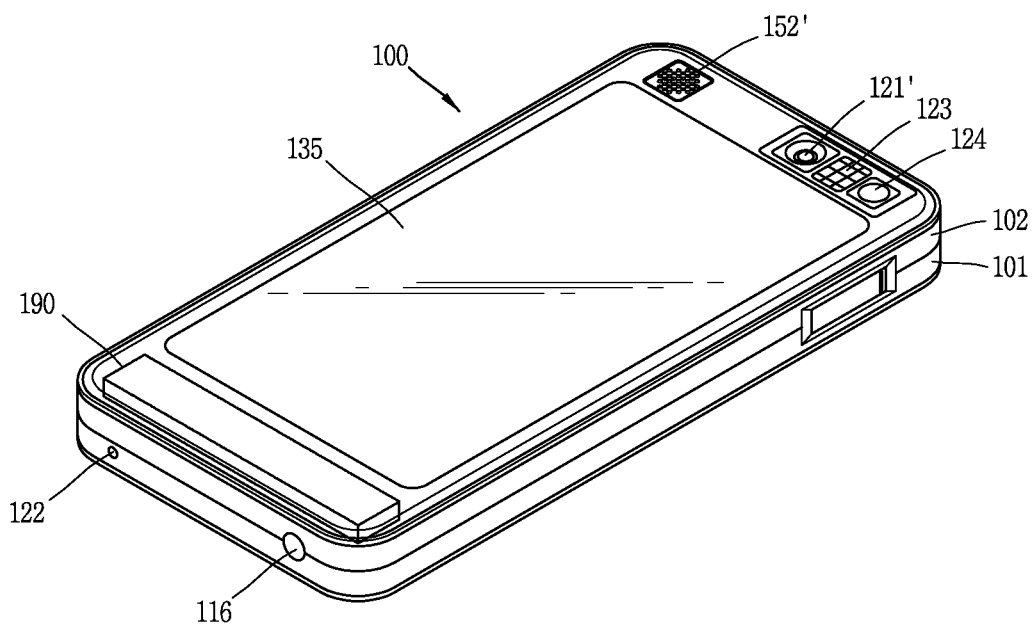
FIG. 2B is a rear perspective view illustrating an example of a mobile terminal according to an embodiment of the present disclosure.

FIG. 2A is a front perspective view illustrating a mobile terminal according to the present disclosure or an example of the mobile terminal, and FIG. 2B is a rear perspective view illustrating a mobile terminal illustrated in FIG. 2A.

The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction.

The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, and the like may be arranged on the terminal body 100, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Referring to FIG. 2B, an audio output unit 152' may be additionally disposed on a rear surface, namely, a rear case 102, of the terminal body. The audio output unit 152' together with the audio output unit 152 (refer to FIG. 2A) can implement a stereo function, and it may be also used to implement a speaker phone mode during a phone call.

Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body.

Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121.

For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner.

Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

Furthermore, an audio output unit 252' may be additionally disposed on a rear surface of the terminal body. The audio output unit 252' together with the audio output unit 252 (refer to FIG. 2A) can implement a stereo function, and it may be also used to implement a speaker phone mode during a phone call.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Furthermore, a page having a predetermined length may be displayed on the display unit 151 of the mobile terminal including at least one of the foregoing constituent elements according to an embodiment of the present disclosure. In this case, the entire page or at least part of the page may be displayed according to the length of the page on the display unit 151. When at least part of the page is displayed on the display unit 151, the display unit 151 may change the display range of the page displayed on the display unit 151 based on a touch with a predetermined scheme to the display unit. Here, the touch with a predetermined scheme may be a drag touch, a flicking touch, or a touch for selecting a scroll bar. In other words, the controller 180 may change a portion displayed on the display unit 151 within the range of page having a predetermined length based on the touch. Moreover, the controller 180 may control information displayed on the display unit 151 in a different manner according to the direction to which the touch with the predetermined scheme is applied.

For example, when there exists a page divided into a first, a second and a third region, and the second region is displayed on the display unit 151, if the touch with the predetermined scheme is applied in the first direction, the controller 180 may display the first region on the display unit 151. Furthermore, on the contrary, when the touch with the predetermined scheme is applied in the second direction opposite to the first direction, the controller 180 may display the third region on the display unit 151.

In this manner, page may denote a unit for dividing information. In other words, the controller 180 may change screen information to correspond to a touch corresponding to the predetermined scheme. Meanwhile, the length of the page may vary according to the amount of information contained in the page. Various types of screen information displayed on the mobile terminal according to an embodiment of the present disclosure may be expressed with pages. For example, when an execution screen of an application, a standby screen (or home screen page), a lock screen, a phone call screen, a phonebook list, a menu screen, an alarm setting screen, a webpage displayed in a web browser, and the like may be expressed with a "page".

On the other hand, since the page has a predetermined length, when a region corresponding to the edge of the page is displayed on the display unit 151, the controller 180 may not change screen information displayed on the display unit 151 even if a touch for changing a portion of the page displayed on the display unit 151 is applied. As a result, a mobile terminal according to the present disclosure may display a region beyond the edge region of the page when screen information displayed on the display unit 151 corresponds to the edge region of the page, and a touch for changing at least part of the page displayed on the display unit 151 to at least another part thereof is applied. Furthermore, a mobile terminal according to the present disclosure may provide information on another page different from a page previously displayed in a region beyond the edge, thereby providing intuitive information for the another page.

Hereinafter, a method of providing information associated with another page in a region beyond the edge of the page will be described in more detail along with the accompanying drawings. FIG. 3 is a flow chart for explaining a method of controlling a mobile terminal according to an embodiment of the present disclosure, and FIGS. 4A, 4B, 4C, 4D and 4E are conceptual views for explaining a control method corresponding to the foregoing flow chart of FIG. 3.

In a mobile terminal according to an embodiment of the present disclosure, the process of displaying screen information corresponding to at least part of a page on the display unit 151 is carried out (S310). The controller 180 may display a page on the display unit 151 based on the user's selection. For example, when there is an execution request for an application, the controller 180 may display a page corresponding to the execution screen of the application.

In this manner, in a state that screen information corresponding to at least part of the page on the 151, the process of sensing a touch to the display unit 151 is carried out (S320). The controller 180 may perform different functions associated with the page or perform a function associated with the general control of the mobile terminal.

As in the process S320, when a touch is sensed, and the sensed touch is a touch corresponding to a predetermined scheme for changing at least part of screen information displayed on the display unit within the page range to another screen information, the process of changing at least part of the screen information displayed on the display unit 151 to screen information corresponding to at least another part contained in the page may be carried out (S330).

Here, the touch corresponding to the predetermined scheme may be a touch may be a drag touch, a flicking touch, or a touch for selecting a scroll bar. Furthermore, the controller 180 may change screen information displayed on the display unit 151 based on a control command sensed through at least one of various sensors provided in the mobile terminal 100 even without sensing a touch to the display unit 151. Here, "changing screen information" may correspond to the meaning of "moving a page (or moving the display range of a page) to change a portion displayed on the display unit within a page having a predetermined length".

On the other hand, when screen information that has been displayed on the display unit 151 prior to sensing the touch corresponds to an edge region of the page in a state that the touch is sensed, the process of displaying screen information corresponding to a predetermined condition in a region beyond the edge of the page is carried out (S340).

Figure 4A:
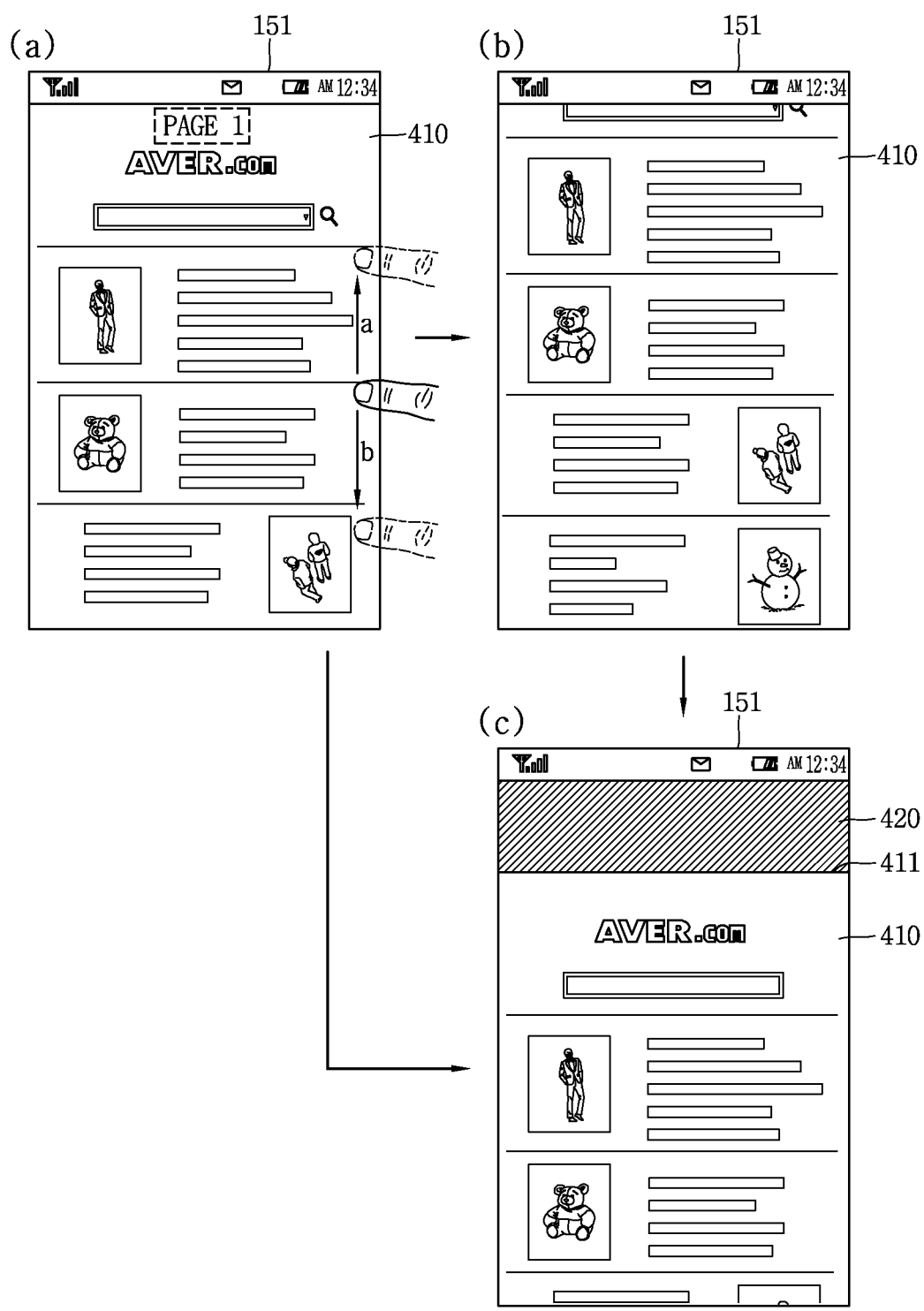
FIGS. 4A, 4B, 4C, 4D and 4E are conceptual views for explaining a control method corresponding to the foregoing flow chart of FIG. 3.

For example, as illustrated in FIG. 4A(a), when a touch corresponding to a predetermined scheme is applied in the "a" direction in a state that the first page 410 having a predetermined length is displayed, the controller 180 may change at least part of the first page 410 displayed on the display unit 151 to screen information corresponding to at least another part thereof by moving the first page 410 as illustrated in FIG. 4A(b). Furthermore, as illustrated in FIG. 4A(a), when a touch corresponding to a predetermined scheme is applied in the "b" direction in a state that the first page 410 having a predetermined length is displayed, and it is located in the edge region of the first page (for example, an upper end portion region of the first page) where the first page 410 displayed on the display unit 151 is not required to be changed any more along a touch corresponding to the "b" direction, the controller 180 may display a region 420 beyond the edge 411 of the first page 410 as illustrated in FIG. 4A(c).

Figure 4B:
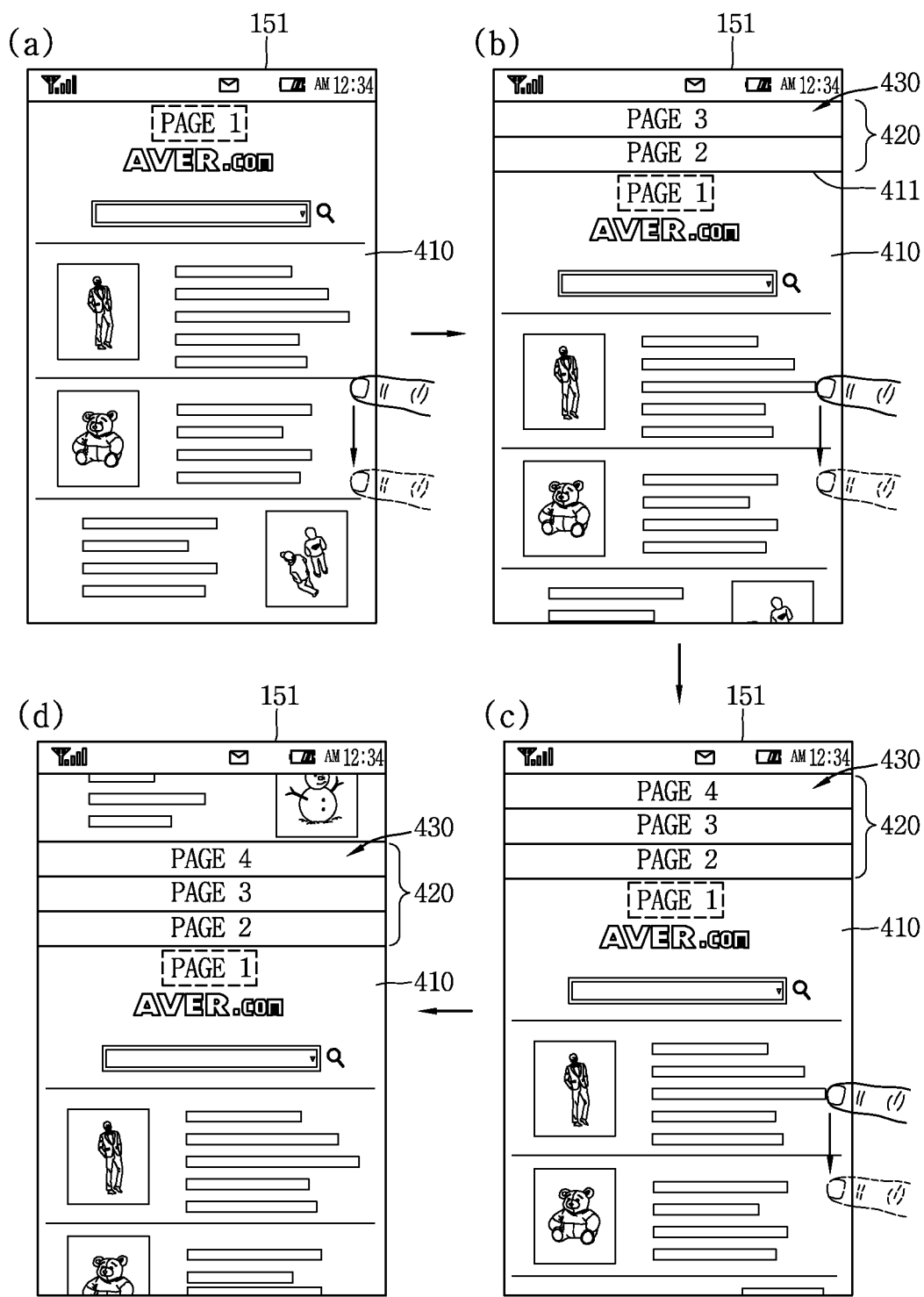

Furthermore, the controller 180 may display at least part of screen information corresponding to a predetermined condition in the region 420 beyond the edge 411 as illustrated in FIGS. 4B(a) and 4B(b).

Here, at least part of screen information corresponding to a predetermined condition may correspond to at least another page associated with a page, for example, the first page, previously displayed on the display unit 151. The associated at least another page may be a page for performing a function similar to the first page.

For example, when the first page is a webpage, the at least another page may be a webpage corresponding to a URL registered through a favorite function or anther webpage that has been displayed on the display unit 151 prior to displaying a webpage corresponding to the first page. Furthermore, when the first page is a dial screen for making an outgoing call, the at least another page may be a page corresponding to a recent call list or a page corresponding to a favorite contact list. Furthermore, when the first page is a messenger conversation screen with a first recipient, and the at least anther page may be a messenger conversation screen with at least one recipient who is different from the first recipient, an incoming message list screen, or an outgoing message list screen. Moreover, when a first image contained in a photo album is displayed on the first page, the at least another page may be at least one image different from the first image contained in the photo album. In addition, when the first page is an alarm setting screen, the at least another page may be another alarm setting screen for newly setting an alarm. Furthermore, when the first page is a schedule screen, the at least another page may correspond to another schedule screen different from the schedule displayed on the display unit.

In this manner, at least another associated with the first page may be configured in various ways according to information displayed in the first page. Furthermore, a mobile terminal according to an embodiment of the present disclosure may display various screen information in a region beyond the edge of the page without being restricted to the foregoing embodiments.

Furthermore, information displayed in a region beyond the edge of the page may be something for allowing the user to use the mobile terminal in more convenient manner.

For example, information on an application executed under multitasking, information on a recently executed application, information on a received event upon receiving the event, information from which at least part of information contained in the current displayed page is extracted according to a predetermined condition and the like may be displayed in a region beyond the edge of the page.

Furthermore, information corresponding to a function associated with a function corresponding to the currently displayed page may be displayed in a region beyond the edge of the page. For example, when the currently displayed page is a webpage, screen information corresponding to search, dictionary, map functions may be displayed in a region beyond the edge. Meanwhile, a function corresponding to screen information corresponding to a function displayed in a region beyond the edge may be a function previously set by the user.

As described above, there are various types of information that can be displayed in a region beyond the edge of the page displayed on the display unit 151, and hereinafter, for the sake of convenience of explanation, screen information displayed on the display unit may be expressed as a first, a second, a third page, and the like.

On the other hand, as illustrated in FIGS. 4B(a) and 4B(b), in a mobile terminal according to an embodiment of the present disclosure, screen information corresponding to at least one page different from a first page displayed in a region 420 beyond the edge 411 may be displayed in a list format. In other words, when the at least another page is a plural number, a list containing a plurality of items may be displayed in the region 420 beyond the edge.

The list may be displayed in a consecutive manner to the edge 411 of the first page 410 as illustrated in the drawing. Meanwhile, the controller 180 may control the size of the region 420 beyond the edge in a different manner from one another based on at least one of the touch length and touch speed of a touch (or a touch corresponding to a predetermined scheme) for moving the first page 410. In other words, the controller 180 may adjust the number of items displayed in the region 420 beyond the edge along the touch length and touch speed of the touch.

Figure 4C:
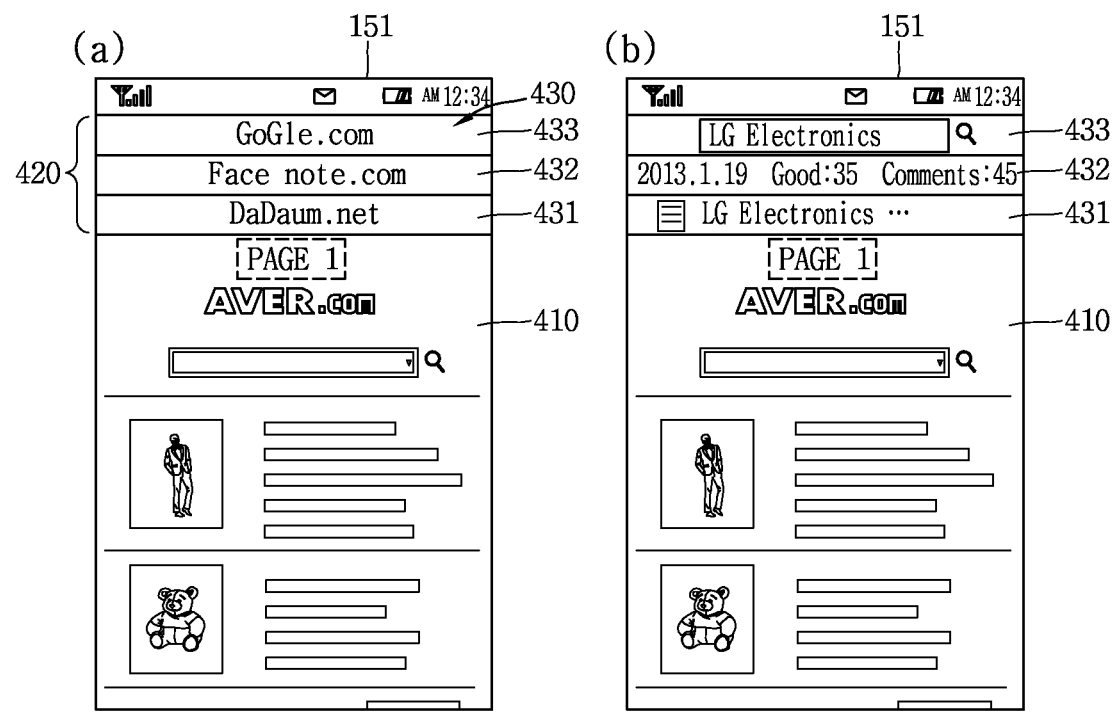

On the other hand, the controller 180 may gradually move an item displayed in the region 420 beyond the edge on the display unit 151 as illustrated in FIG. 4C(c) based on a touch consecutive to the touch (or a touch applied with a time interval from the touch) as illustrated in FIG. 4B(b).

On the other hand, when at least another page associated with the first page 410 is three, and only items corresponding to two pages (for example, a second and a third page) is displayed at the initial stage as illustrated in FIG. 4B(b), the controller 180 may additionally display an item corresponding to the fourth page while at the same time moving items corresponding to the second and the third page based on the consecutive touch. In other words, the controller 180 may control the extent of displaying the list 430 to be varied based on a touch applied to the display unit 151. In this case, the size of the region 420 beyond the edge may be increased.

On the other hand, when a touch is continuously applied to the display unit 151 in a state that the list 430 corresponding to another page associated with the first page is all displayed as illustrated in FIG. 4B(c), the controller 180 may display at least part of screen information that has been displayed on the display unit prior to applying the touch in a region beyond the edge of an item located at the uppermost end among items corresponding to the another page, respectively, as illustrated in FIG. 4B(d). In other words, the controller 180 may display at least part of the first page that has been displayed on the display unit 151 again in a region beyond the edge of the list 430. In other words, in this case, screen information corresponding to the first page that has been displayed on the display unit prior to displaying the list may be circulatively moved by placing the at least one item therebetween.

On the other hand, in a mobile terminal according to an embodiment of the present disclosure, items contained in the list 430 may have various visual appearances. For example, as illustrated in FIG. 4C(a), information representing a page corresponding to each item 431, 432, 433 may be displayed on the each item. For example, when the page corresponding to each item 431, 432, 433 is a webpage, the site name of the webpage may be displayed on the each item 431, 432, 433. Furthermore, according to another example, as illustrated in FIG. 4C(b), at least part of each page may be displayed on each item.

Figure 4D:
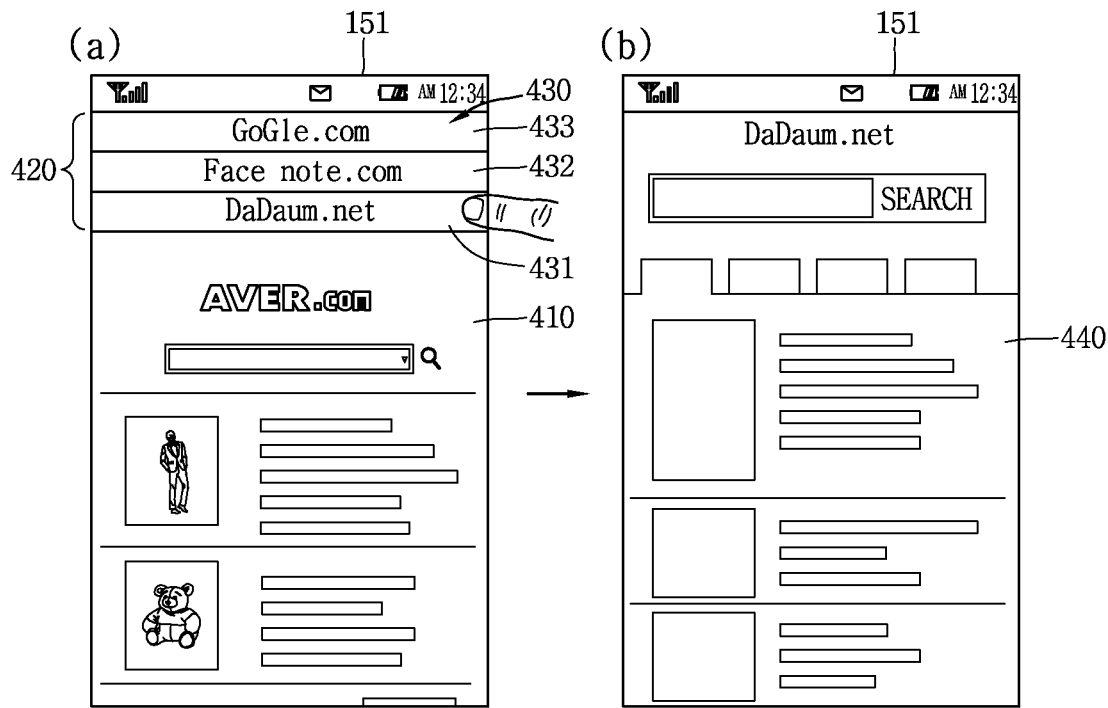
Figure 4E:
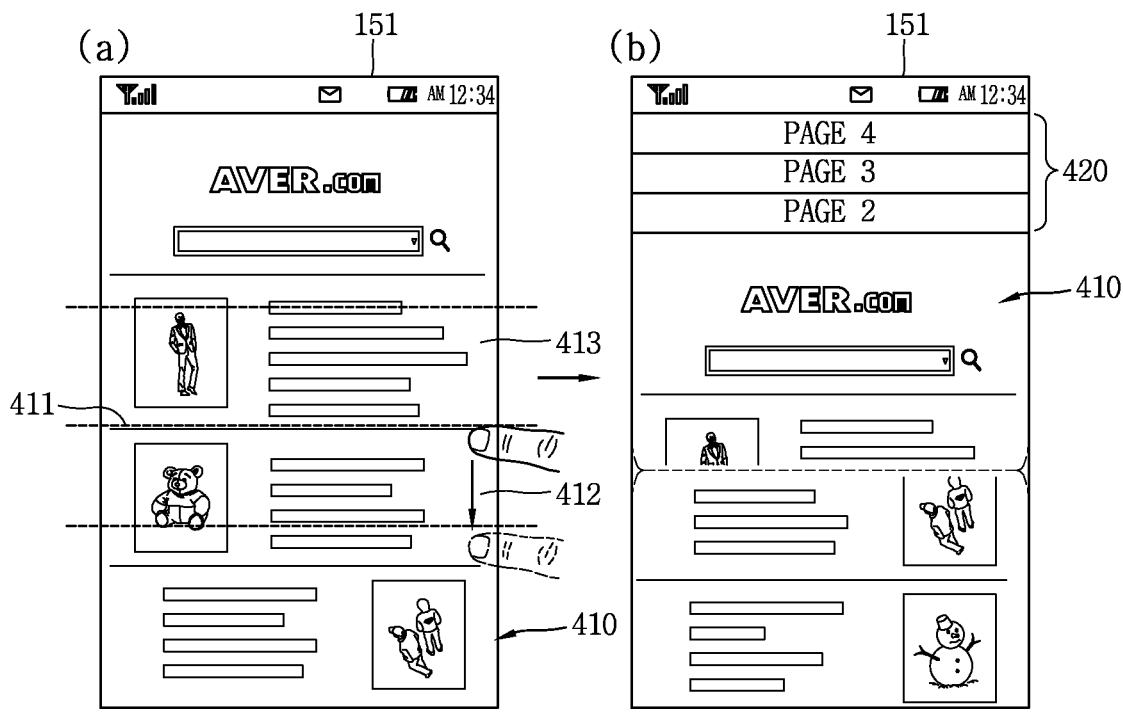

On the other hand, according to a mobile terminal according to an embodiment of the present disclosure, when any one item 431 is selected from the items contained in the list displayed in the region 420 beyond the edge as illustrated in FIG. 4D(a), the controller 180 may control the display unit 151 to display a page 440 corresponding to the selected item 431 as illustrated in FIG. 4D(b). In other words, the controller 180 may switch the first page 410 to a page corresponding to the selected item 431, and moreover, may not display the list 430 any more.

On the other hand, as described above, when a region beyond the edge of the first page 410 displayed on the display unit 151 is displayed, the size of a region displayed with the first page 410 may be reduced. In other words, the size of the first page 410 displayed with the page may be changed in connection with the size of a region (or a region 420 beyond the edge) displayed with the list. When the size of a region displayed with the first page 410 is reduced, the controller 180 may not display at least part of the page 410 that has been displayed on the display unit 151. In this case, the controller 180 may not gradually display at least part of the first page 410 in symmetrical to a virtual reference line 411 located on the display unit 151 or a virtual reference line located on the page.

For example, when the virtual reference line is located in the middle of the page, the page may not gradually displayed on the display unit 151 from the start of the middle portion of the page as decreasing a region capable of displaying the page. In this case, the end of the page may be displayed up to the last.

On the other hand, for the sake of convenience, when a region beyond the edge of the page is displayed according to a touch for moving a page displayed on the display unit, the "region displayed with the page" may be expressed as a first region, and the "region beyond the edge" as a second region.

As described above, a mobile terminal according to an embodiment of the present disclosure and a control method thereof may provide useful information to the user in a region beyond the edge of a page, thereby enhancing the user's convenience.

Hereinafter, a method of controlling a list displayed in a region beyond the edge will be described in more detail with reference to the accompanying drawings. FIGS. 5A, 5B, 5C, 5D, 6A and 6B are conceptual views for explaining a method of moving a list in a mobile terminal according to an embodiment of the present disclosure.

As described above, when a list is displayed in a region beyond the edge of the page in response to a touch corresponding to a predetermined scheme, the list may be continuously or temporarily displayed on the display unit 151.

Figure 5A:
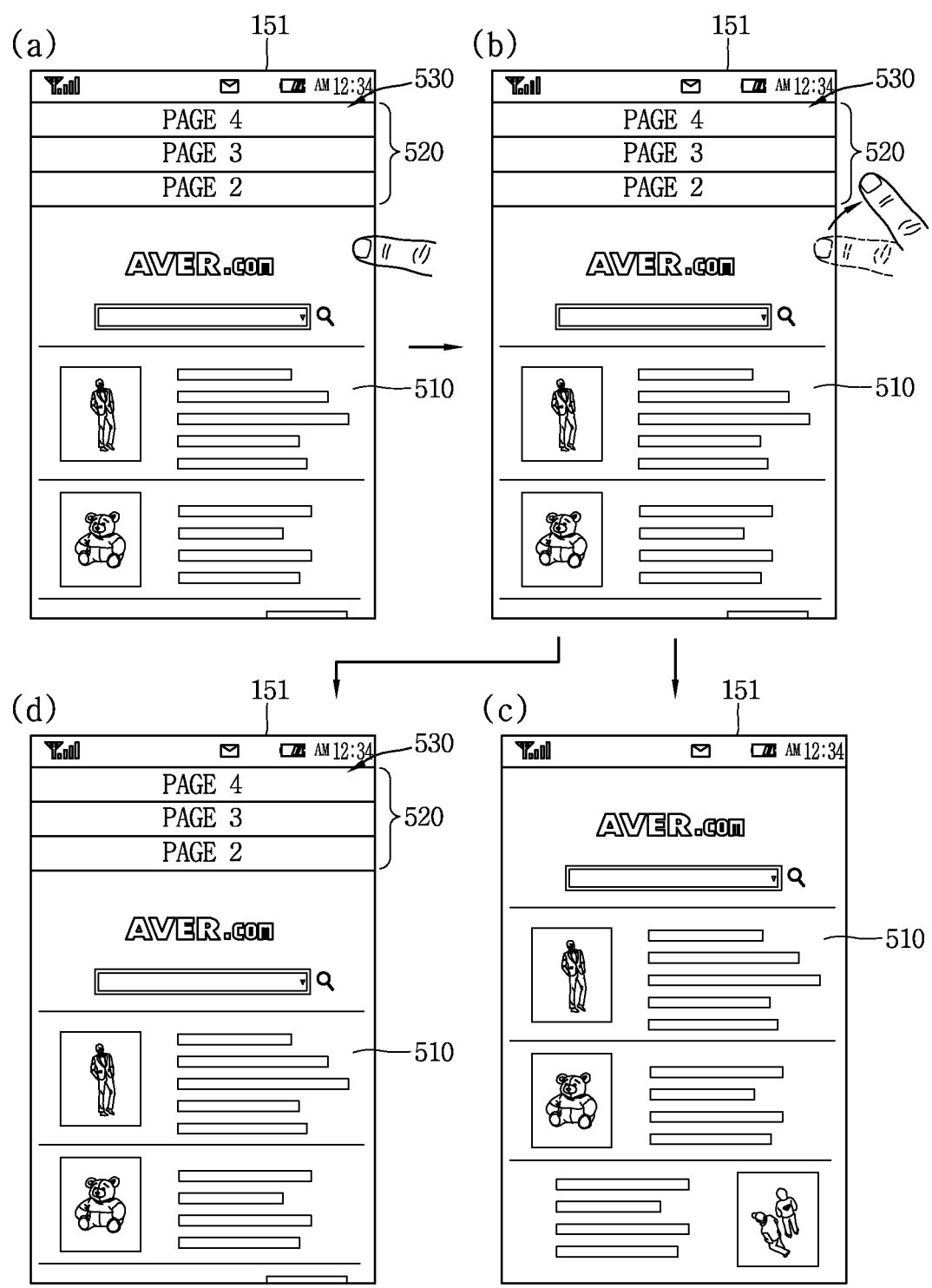
FIGS. 5A, 5B, 5C, 5D, 6A and 6B are conceptual views for explaining a method of moving a list in a mobile terminal according to an embodiment of the present disclosure.

According to an embodiment, as illustrated in FIG. 5A(a), in a state that a list 530 is displayed in a region 520 beyond the edge in response to a touch corresponding to the predetermined scheme as illustrated in FIG. 5A(a), when the touch is released as illustrated in FIG. 5A(b), the controller 180 may terminate the region 520 beyond the edge being displayed as illustrated in FIG. 5A(c). In other words, in this case, the controller 180 may terminate the output of the list 530, and display a page that has been displayed on the display unit 151 prior to sensing the touch again.

Furthermore, according to another embodiment, in a state that a list 530 is displayed in a region 520 beyond the edge in response to a touch corresponding to the predetermined scheme as illustrated in FIG. 5A(a), even when the touch is released as illustrated in FIG. 5A(b), the controller 180, the controller 180 may maintain the list 530 being displayed in the region 520 beyond the edge as it is as illustrated in FIG. 5A(d).

Figure 5B:
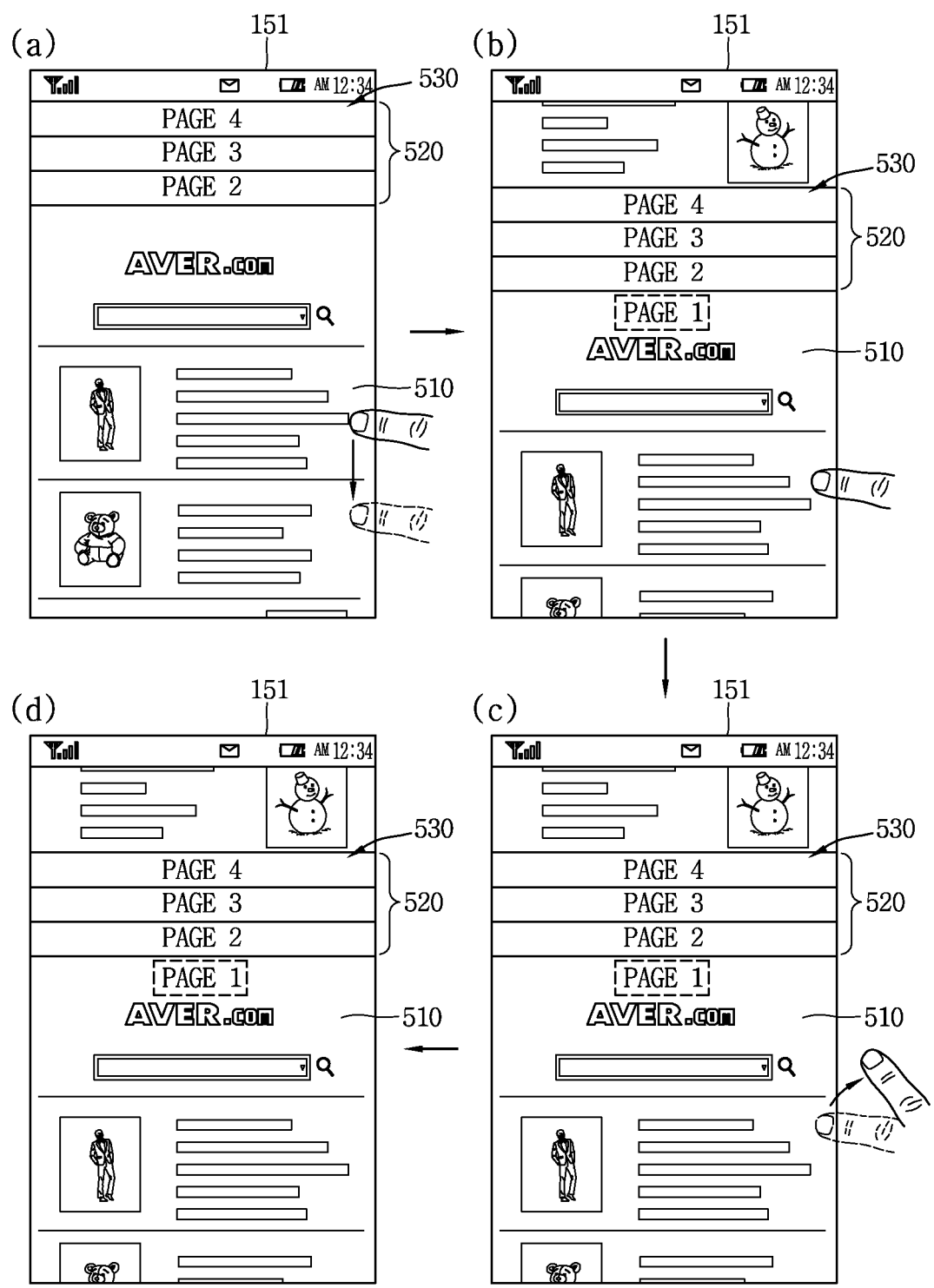

According to another example, as illustrated in FIGS. 5B(a) and 5B(b), when screen information corresponding to the predetermined condition, namely, the list 530 displayed in the region 520 beyond the edge is displayed to correspond to a virtual reference line located on the display unit, even if a touch corresponding to a predetermined scheme for displaying a region beyond the edge is released, the controller 180 may continuously display the list 530 on the display unit 151 as illustrated in FIGS. 5B(c) and 5B(d).

On the other hand, at this time, when the list 530 reaches a virtual reference line located on the display unit 151, the controller 180 may output notification image notifying that the list 530 is continuously displayed on the display unit 151, namely, notifying that the list 530 is fixed thereto through a sound or vibration.

Figure 5C:
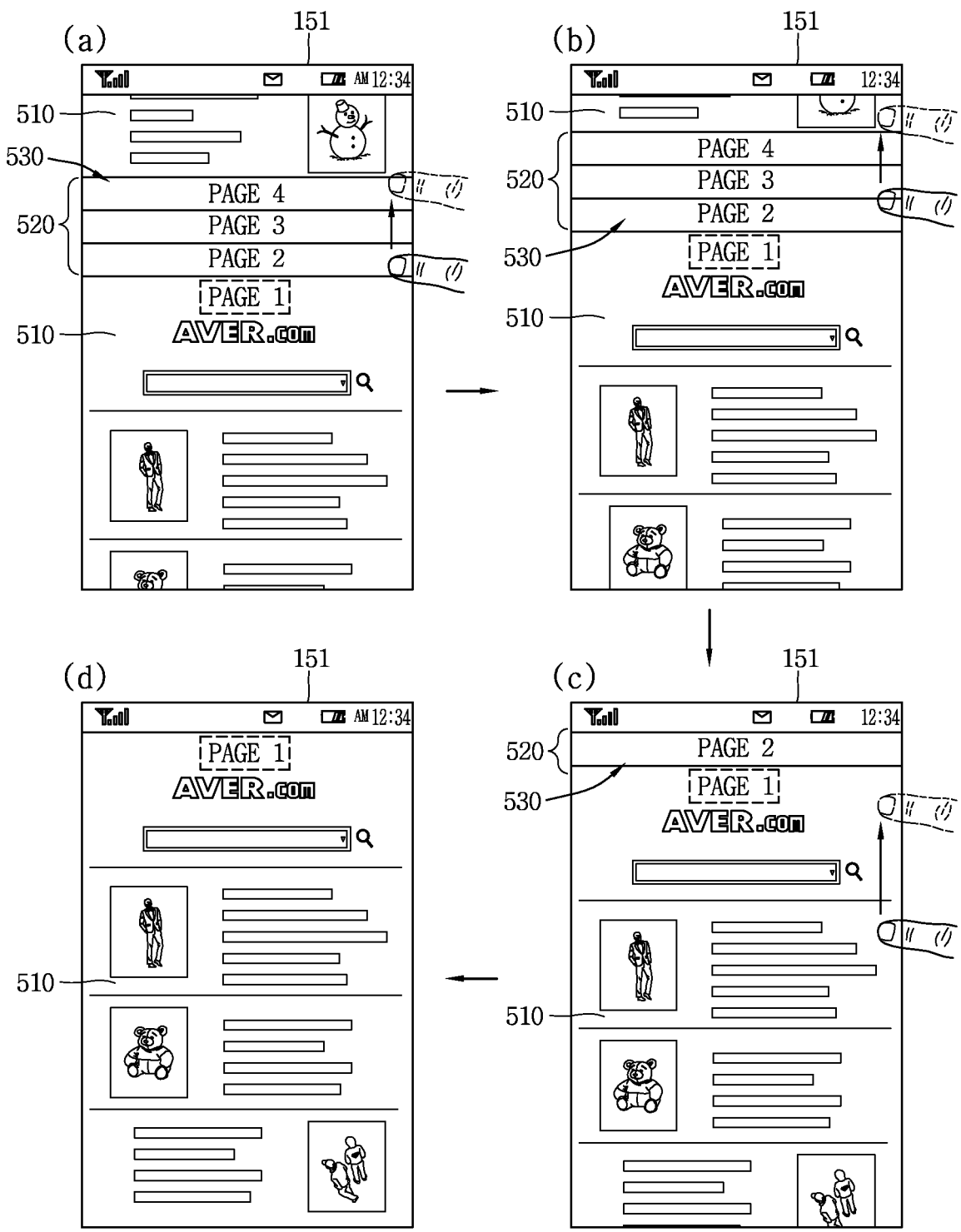

On the other hand, when the list 530 displayed in the region 520 beyond the edge is continuously displayed on the display unit 151, the controller 180 may control the location displayed with the list or the displayed content based on a touch to the display unit 151. For example, the controller 180 may control the display unit 151 to vary the content displayed with a list based on a touch direction applied to the page or list as illustrated in FIGS. 5C(a), 5C(b) and 5C(c). In other words, the controller 180 may control the display unit 151 not to gradually display the list 530 according to the touch direction or touch extent. Furthermore, as illustrated in FIGS. 5C(c) and 5C(d), the controller 180 may control the display unit 151 not to display the list 530 any more through a continuous touch to the display unit 151.

Figure 5D:
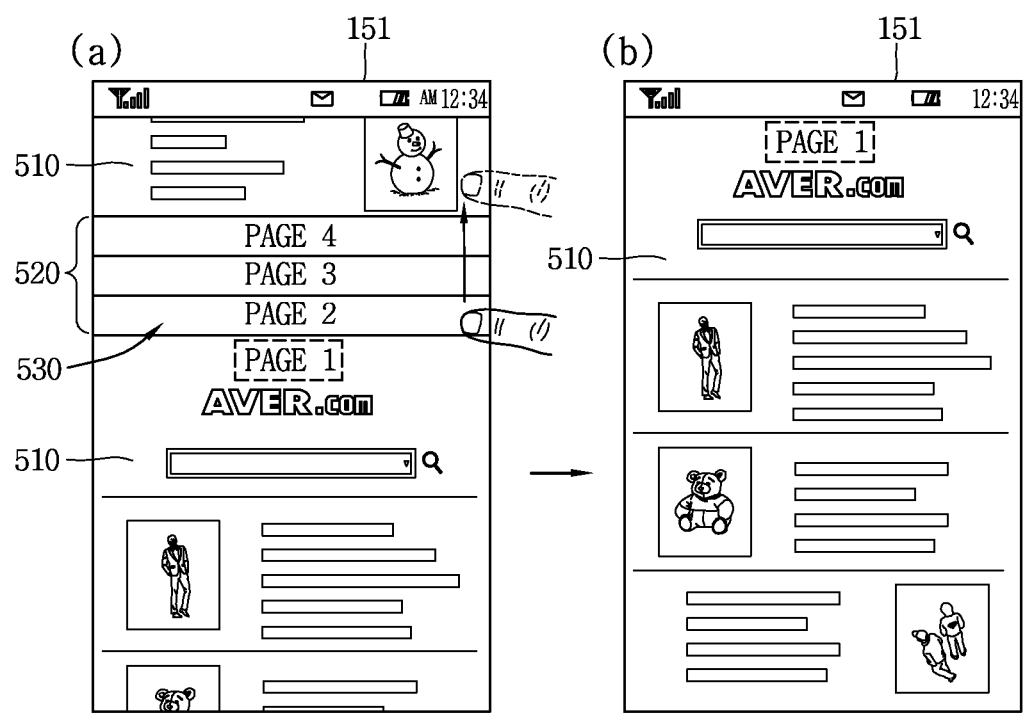

According to another example, when a drag or flicking touch input above a reference speed is sensed on the display unit 151 as illustrated in FIG. 5D(a), the controller 180 may control the display unit 151 not to display the list 530 as illustrated in FIG. 5D(b). In other words, in this case, the list 530 may not be displayed on the display unit 151 any more in response to one drag or flicking touch.

Figure 6A:
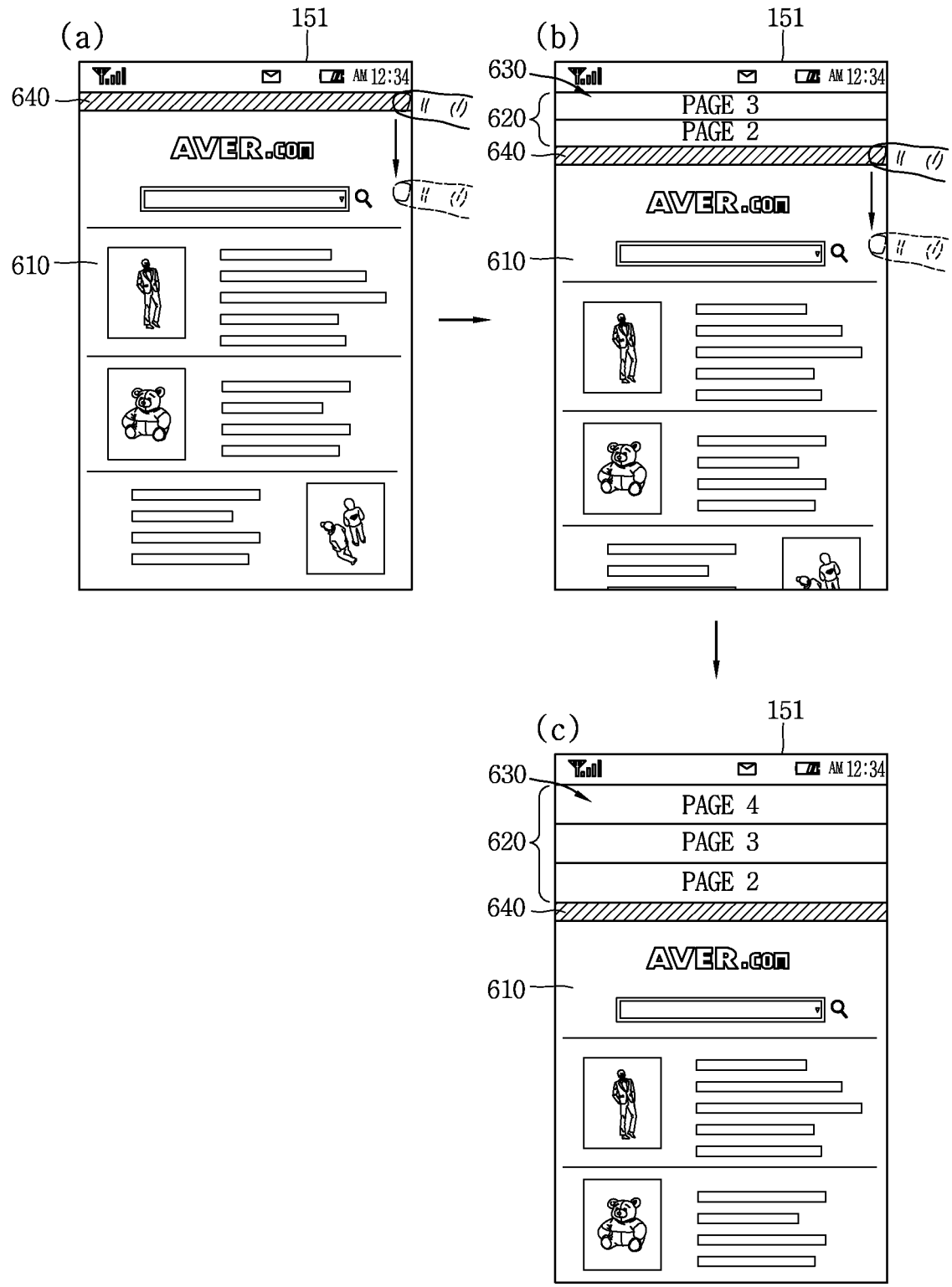

According to still another example, in a mobile terminal according to an embodiment of the present disclosure, when a region 520 beyond the edge is displayed in response to a touch corresponding to a predetermined scheme to the display unit 151, the controller 180 may first display a graphic object 640 on the display unit 151 as illustrated in FIG. 6A(a).

Here, the graphic object 640 may divide the screen into a first region 610 displayed with the page and a second region 620 displayed with a region beyond the page, and the graphic object 640 may be designated as a "handler".

Figure 6B:
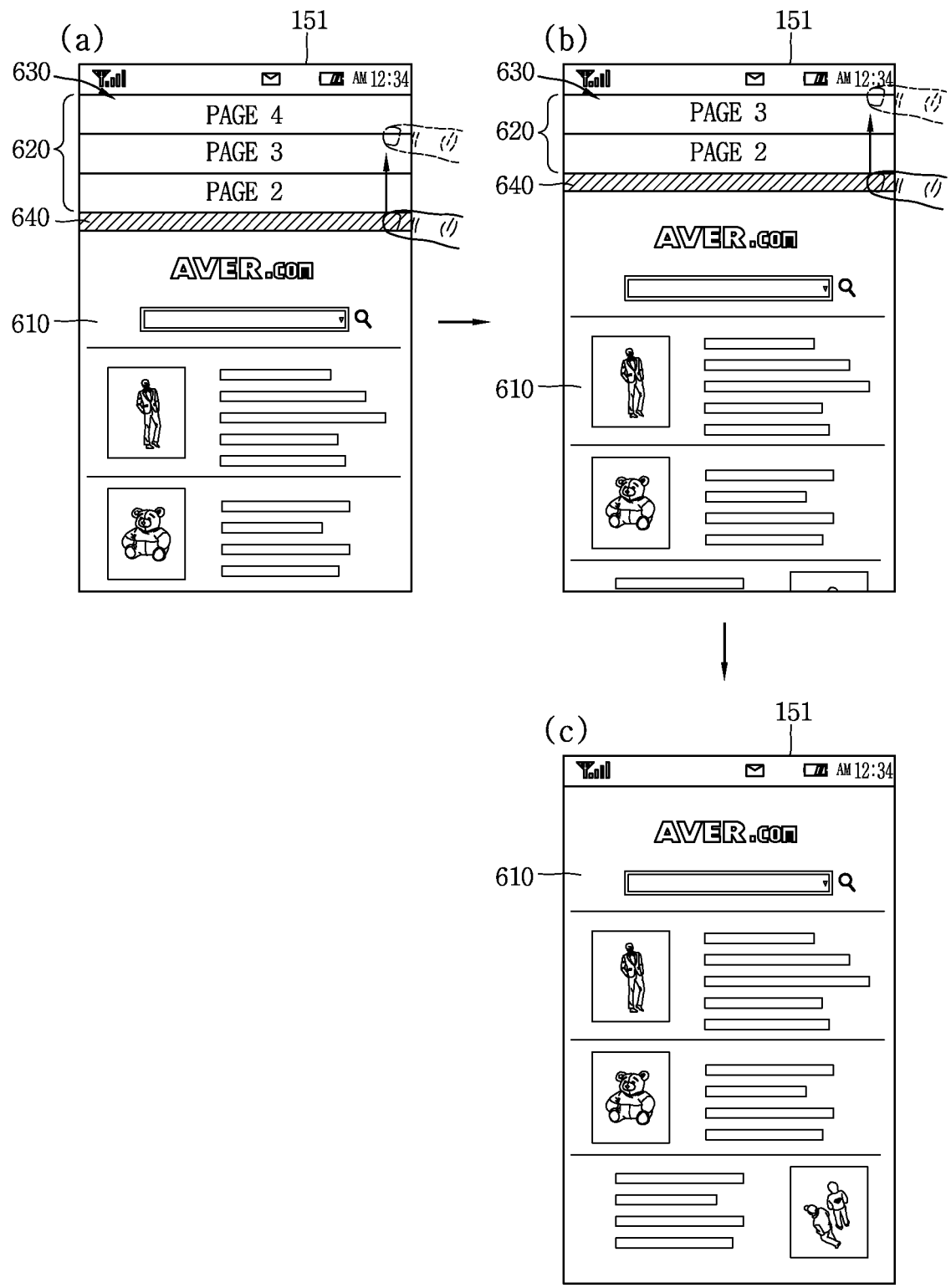

Moreover, the controller 180 may control the first and the second region 610, 620 in response to a touch input to the graphic object 640. The controller 180 may move the graphic object 640 along a touch to the graphic object 640. For example, as illustrated in FIGS. 6A and 6B, when a drag touch started from one position of the graphic object 640 is sensed, the controller 180 may move the graphic object 630 along the sensed drag touch. In this case, the controller 180 may change the size of the first and the second region 610, 620 in connection with the graphic object 640 being moved. In this manner, information displayed in the second region 620 may vary according to the extent at which the graphic object 640 is moved (for example, only part of the list may be displayed). Moreover, as illustrated in FIGS. 6B(b) and 6B(c), the controller 180 may control the display unit 151 not to display the second region 620 any more when the graphic object 640 is moved up to a predetermined region on the upper end portion of the display unit 151 (or when the list is displayed at the lower end portion thereof, the lower end portion of the display unit).

Hereinafter, a method of controlling information displayed in a region beyond the edge will be described in more detail with reference to the accompanying drawings. FIGS. 7A, 7B, 7C, 7D and 7E are conceptual view for explaining a method of displaying information according to an embodiment of the present disclosure.

In a mobile terminal according to an embodiment of the present disclosure, the controller 180 may control the display unit to vary the display size of at least one item (for example, the interval or height between items) according to a location displayed with items contained in the list displayed in a region beyond the edge.

Figure 7A:
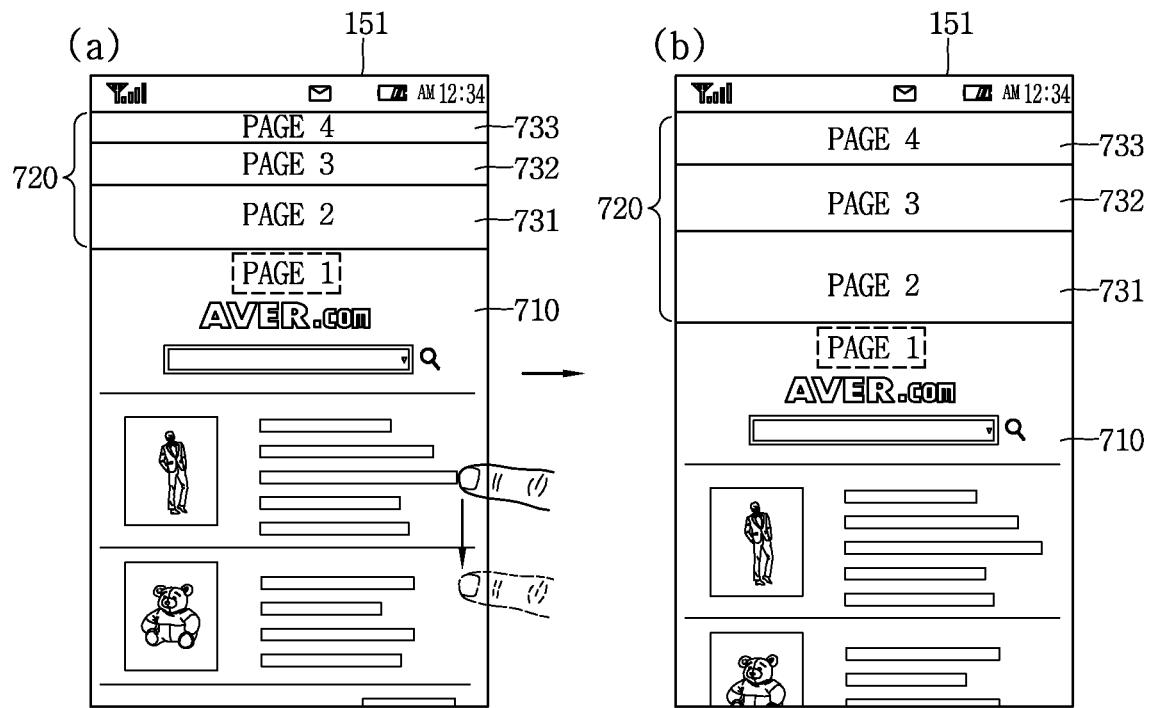
FIGS. 7A, 7B, 7C, 7D and 7E are conceptual view for explaining a method of displaying information according to an embodiment of the present disclosure.

As an example, as illustrated in FIG. 7A(a), the controller 180 may control the display unit 151 to display an item 731 most adjacent to the edge 711 of the page displayed in the first region 710 among items contained in a list displayed in the second region 720 to be displayed larger than the other items 732, 733. Furthermore, as illustrated in FIG. 7A(b), the controller 180 may gradually increase the size of the most adjacent item 731 as gradually increasing the size of the second region 720. Furthermore, in this case, the size of the other items 732, 733 other than the most adjacent item 731 may be adjusted at the same time. In other words, a mobile terminal according to an embodiment of the present disclosure may understand that an increase in the size of the second region according to the user's selection is a user's interest in information displayed in the second region, thereby increasing the amount of information displayed in the second region.

Figure 7B:
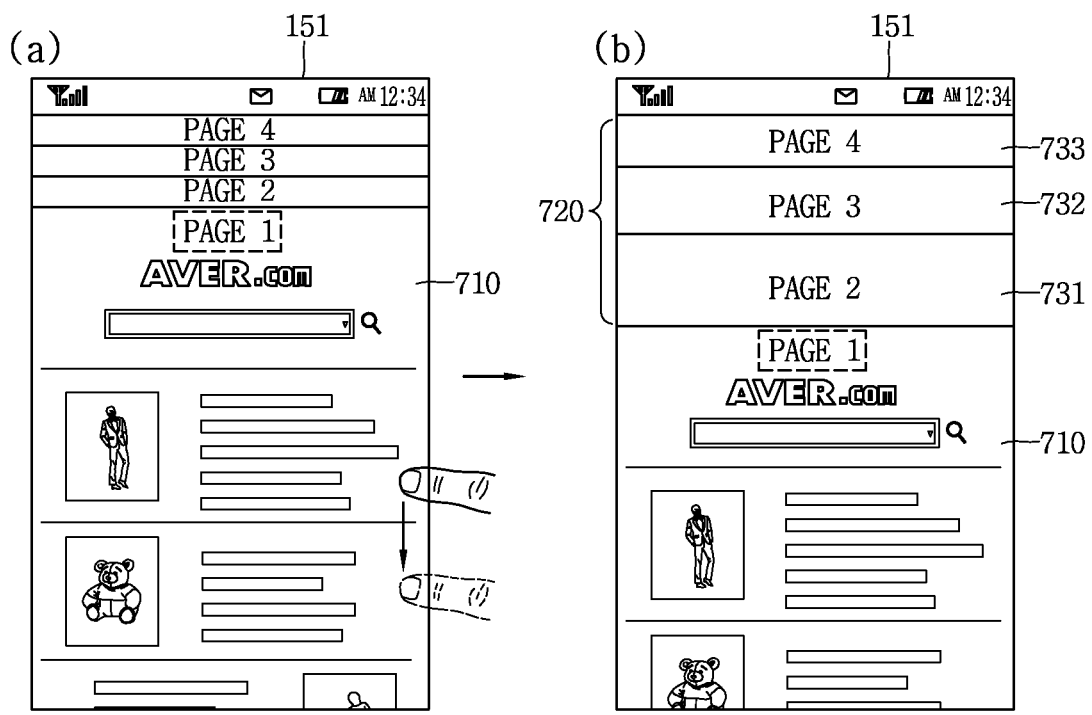

For another example, the controller 180 may control the size of items contained in a list displayed in the second region 720 at the initial stage to be the same as illustrated in FIG. 7B(a), and control the display unit 151 to vary the size of at least one of the items as gradually increasing the size of the second region 720 as illustrated in FIG. 7B(b).

Figure 2C:
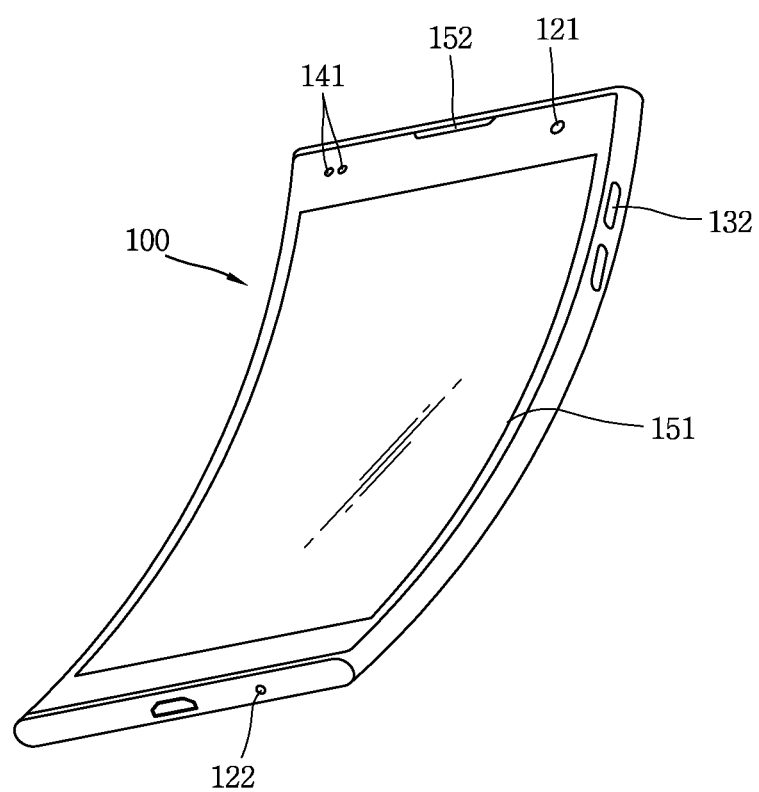
FIG. 2C is a front perspective view illustrating another example of a mobile terminal according to an embodiment of the present disclosure.
Figure 7C:
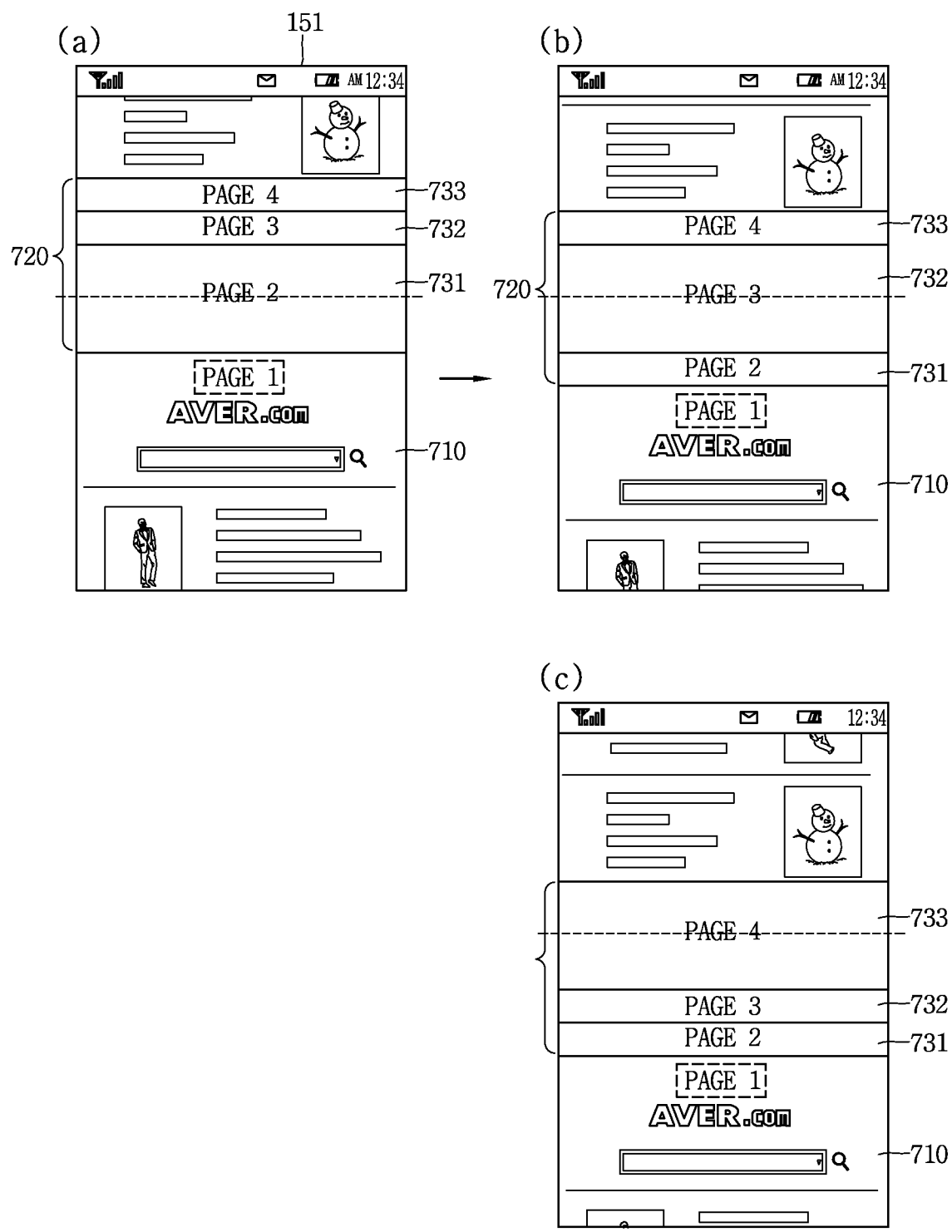

Moreover, as illustrated in FIG. 7C(a), when any one of the items contained in a list displayed in the second region 720 is located at a predetermined reference line 731 contained in the display unit 151, the controller 180 may control the display unit 151 to allow the any one item to be displayed larger than the other items. The predetermined reference line may be located in the middle of the display unit 151. In other words, as illustrated in FIGS. 7C(a), 7C(b) and 7C(c), the controller 180 may control the display unit 151 to allow an item located at the reference line 731 to be displayed in the largest size. Accordingly, the height of an item displayed in the central portion of the display unit 151 may be larger than that of an item displayed at the end of the list. In this case, the height of items may be gradually decreased as located from the middle to the end of the display unit 151. In other words, as illustrated in FIG. 2C, in a curved surface shaped display unit 151, the middle portion of the display unit 151 has a relatively better visibility than the end of the display unit 151, and thus the controller 180 may display information located in the middle portion thereof in a more highlighted manner.

Figure 7D:
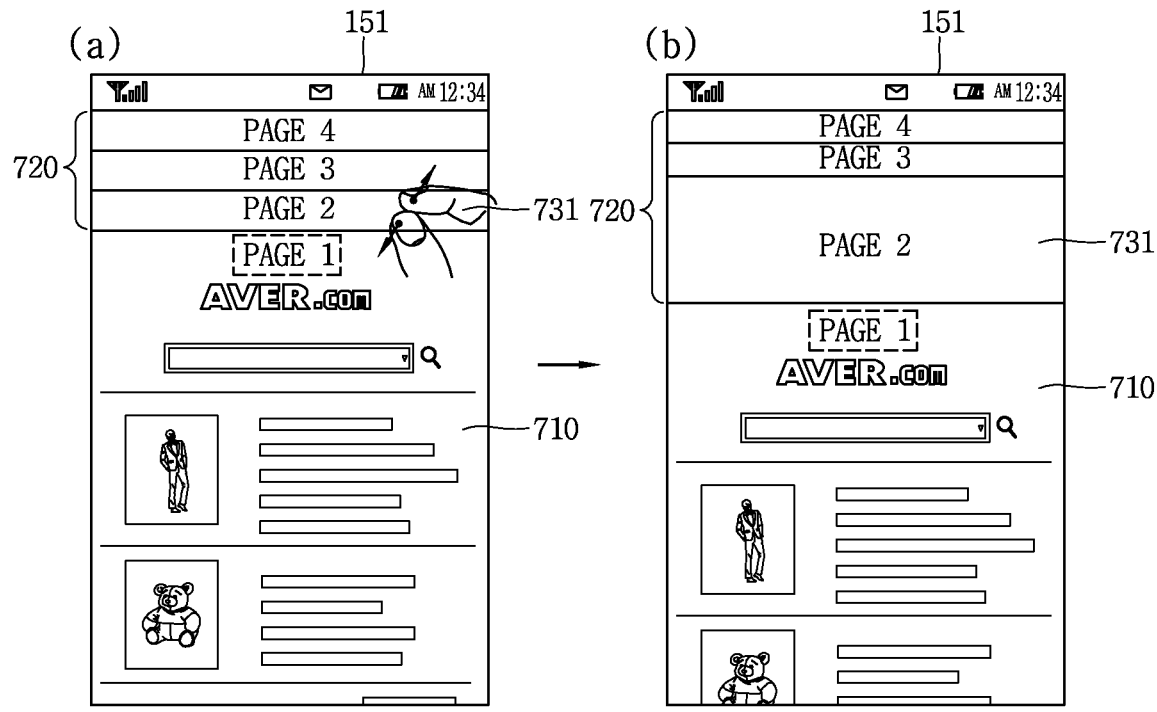

For still another example, as illustrated in FIGS. 7D(a) and 7D(b), when a touch with a pinch-in or pinch-out gesture is applied to any one item 731 of the items displayed in the second region 720, the controller 180 may change the display size of the at least one item.

On the other hand, in this case, the controller 180 may adjust the size of the first region 710 in connection with the display size of the at least one item 731 being changed.

Figure 7E:
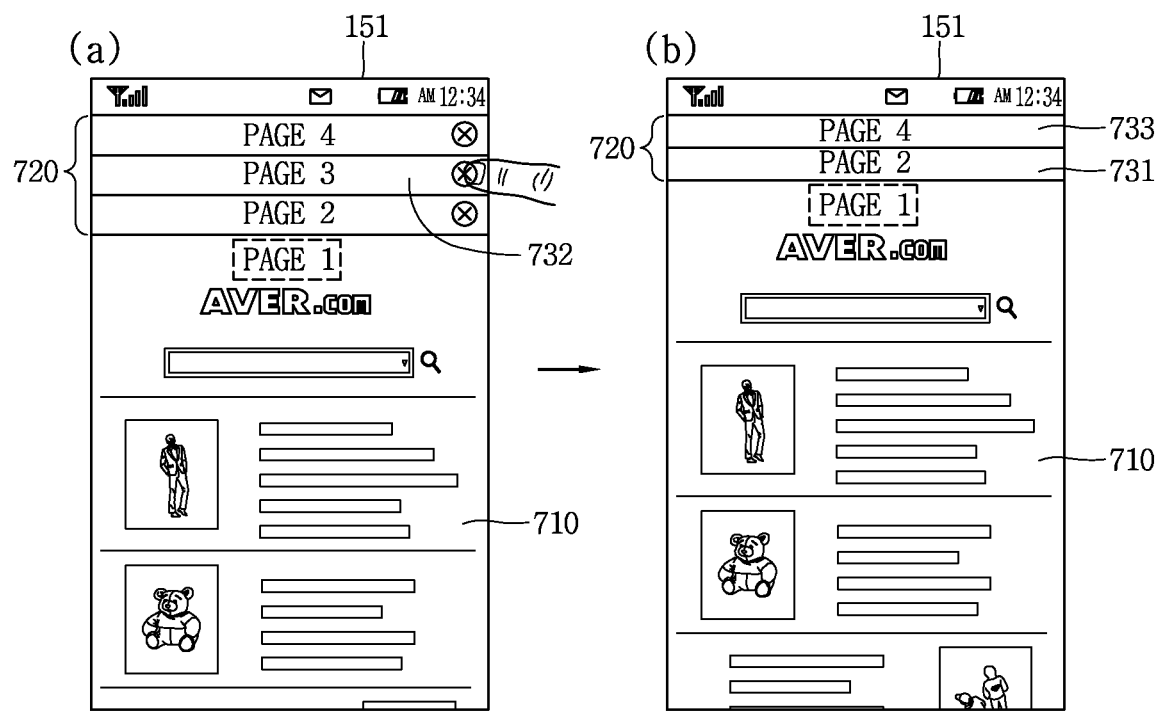

For yet still another example, as illustrated in FIGS. 7E(a) and 7E(b), the controller 180 may delete any one item 732 of the items displayed in the second region 720 based on the user's selection. In this case, the any one item 732 may not be displayed any more on the display unit 151.

Figure 8A:
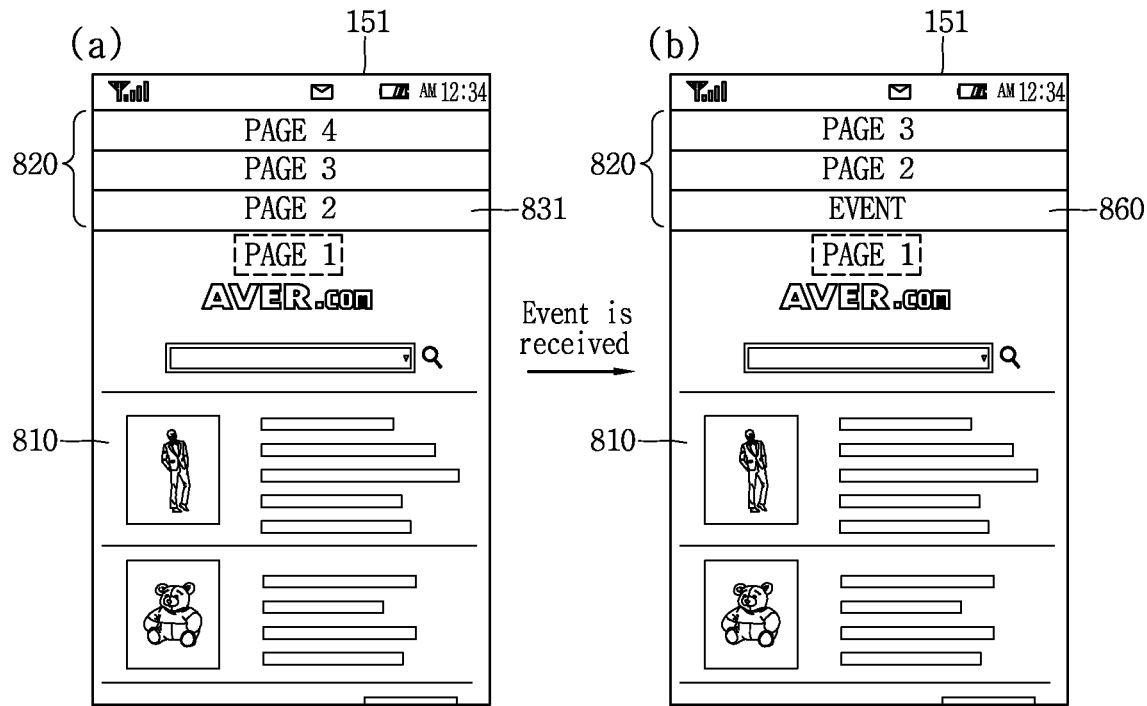
FIGS. 8A and 8B are conceptual views for explaining a method of outputting an event when the event is received in a mobile terminal according to an embodiment of the present disclosure.
Figure 8B:
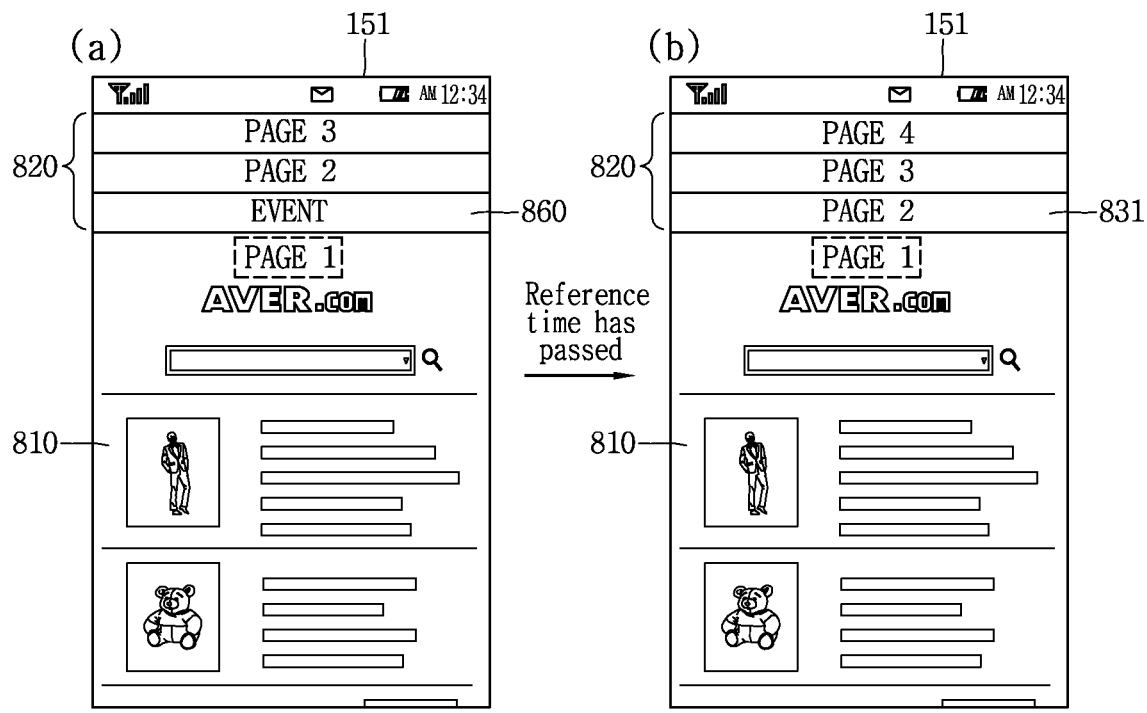

Hereinafter, when an event is received, a method of displaying screen information corresponding to the event in a region beyond the edge will be described in more detail with reference to the accompanying drawings. FIGS. 8A and 8B are conceptual views for explaining a method of outputting an event when the event is received in a mobile terminal according to an embodiment of the present disclosure.

On the other hand, in a mobile terminal according to an embodiment of the present disclosure, when an event is received in a state that a list is displayed on the second region 820 as illustrated in FIG. 8A(a), the controller 180 may change at least part of the list to screen information corresponding to the received event as illustrated in FIG. 8A(b). In other words, the controller 180 may display the received event information 860 on any one of the items contained in the list. Here, the event may indicate a case where a text message, an instant message, a popup message or the like is received.

Furthermore, the controller 180 may control the display unit 151 not to display event information any more as illustrated in FIG. 8B(b) based on the user's selection or a predetermined reference time having been passed in a state that the event information 860 is displayed on any one item as illustrated in FIG. 8B(a). In this case, information that has been displayed prior to displaying event information may be displayed again on an item in which the event has been displayed.

According to the foregoing embodiment, an embodiment of displaying a list in a region beyond the edge has been described, but according to an embodiment of the present disclosure, a different page itself from the page previously displayed on the display unit may be displayed in the region beyond the edge in addition to displaying the list. Moreover, even when a page itself other than the list in a region beyond the edge is displayed, the foregoing embodiments may be applicable in a similar manner.

Hereinafter, specific embodiments for information displayed in a region beyond the edge will be described with reference to the accompanying drawings. FIGS. 9A, 9B, 9C, 10A, 10B, 11, 12, 13 and 14 are conceptual views for describing a specific embodiment in a mobile terminal according to an embodiment of the present disclosure.

Figure 9A:
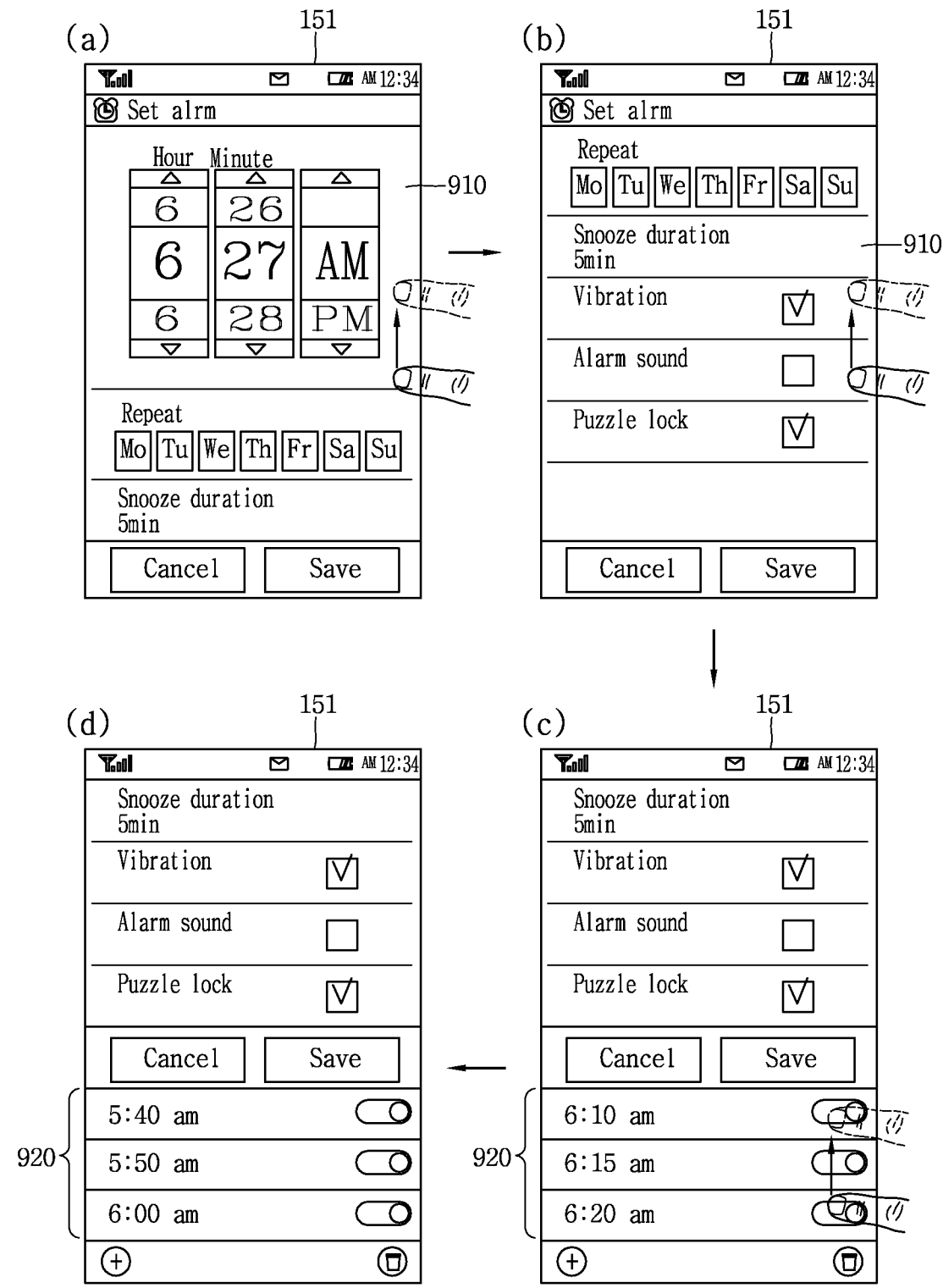

For an example, when the first page 910 displayed on the display unit 151 is an alarm setting screen as illustrated in FIG. 9A(a), the controller 180 may move the first page 910 according to a touch (for example, drag touch or flicking touch) corresponding to a predetermined scheme being applied to the display unit 151. Furthermore, when a touch for moving the first page 910 is applied in a state that an edge region of the first page 910 is displayed as illustrated in FIG. 9A(b), the controller 180 may display a region 920 beyond the edge, and set a new alarm in the region 920 beyond the edge, or display a list for modifying or changing the setting of the predetermined alarm.

Furthermore, as illustrated in FIGS. 9A(c) and 9A(d), the controller 180 may move a list based on a touch to the region 920 beyond the edge. In this case, the controller 180 may maintain the size of the region 920 beyond the edge as it is, and move only the list. Furthermore, the controller 180 may change the size of the region 920 itself beyond the edge, thereby further displaying items contained in the list.

Figure 9B:
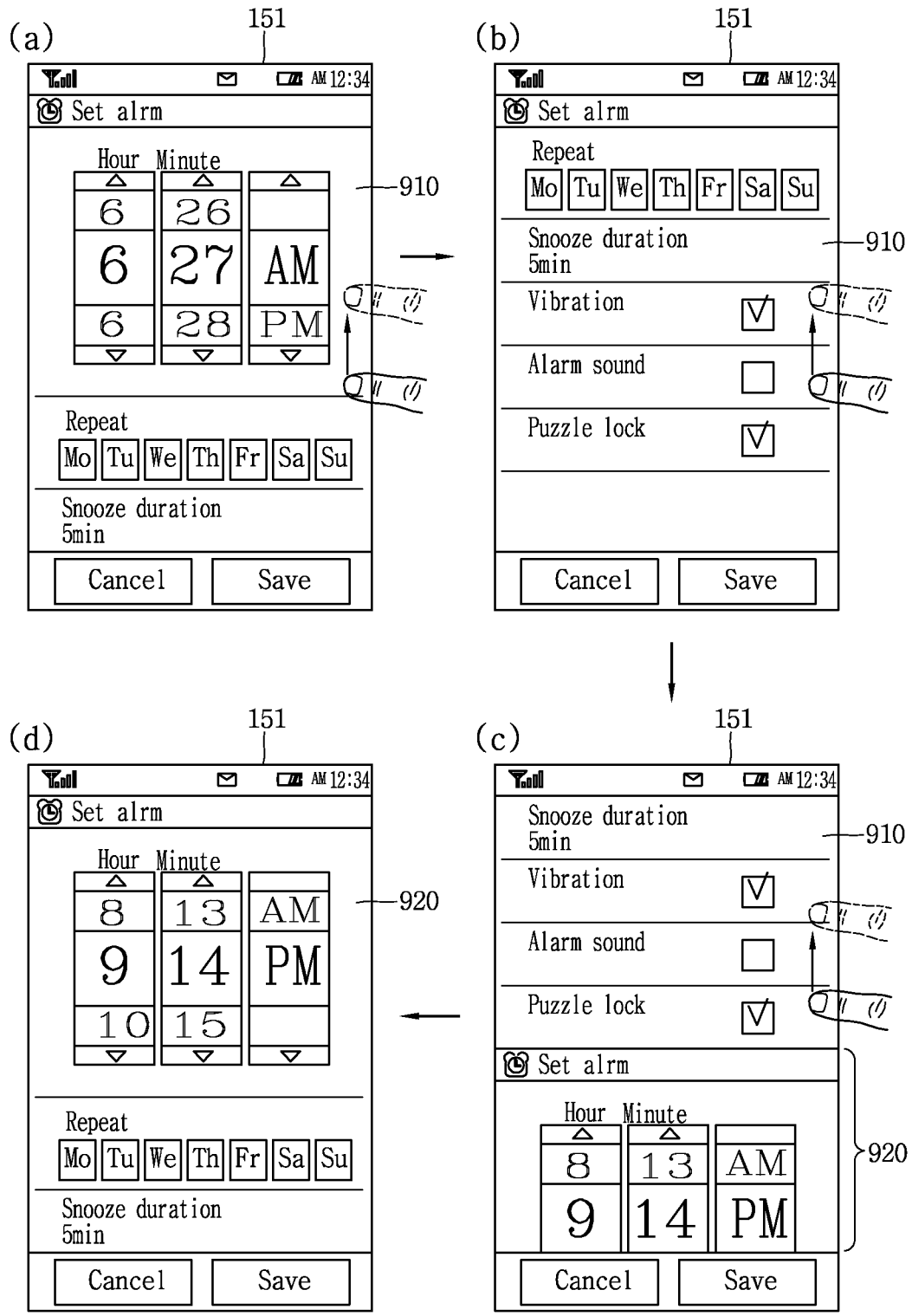
Figure 9C:
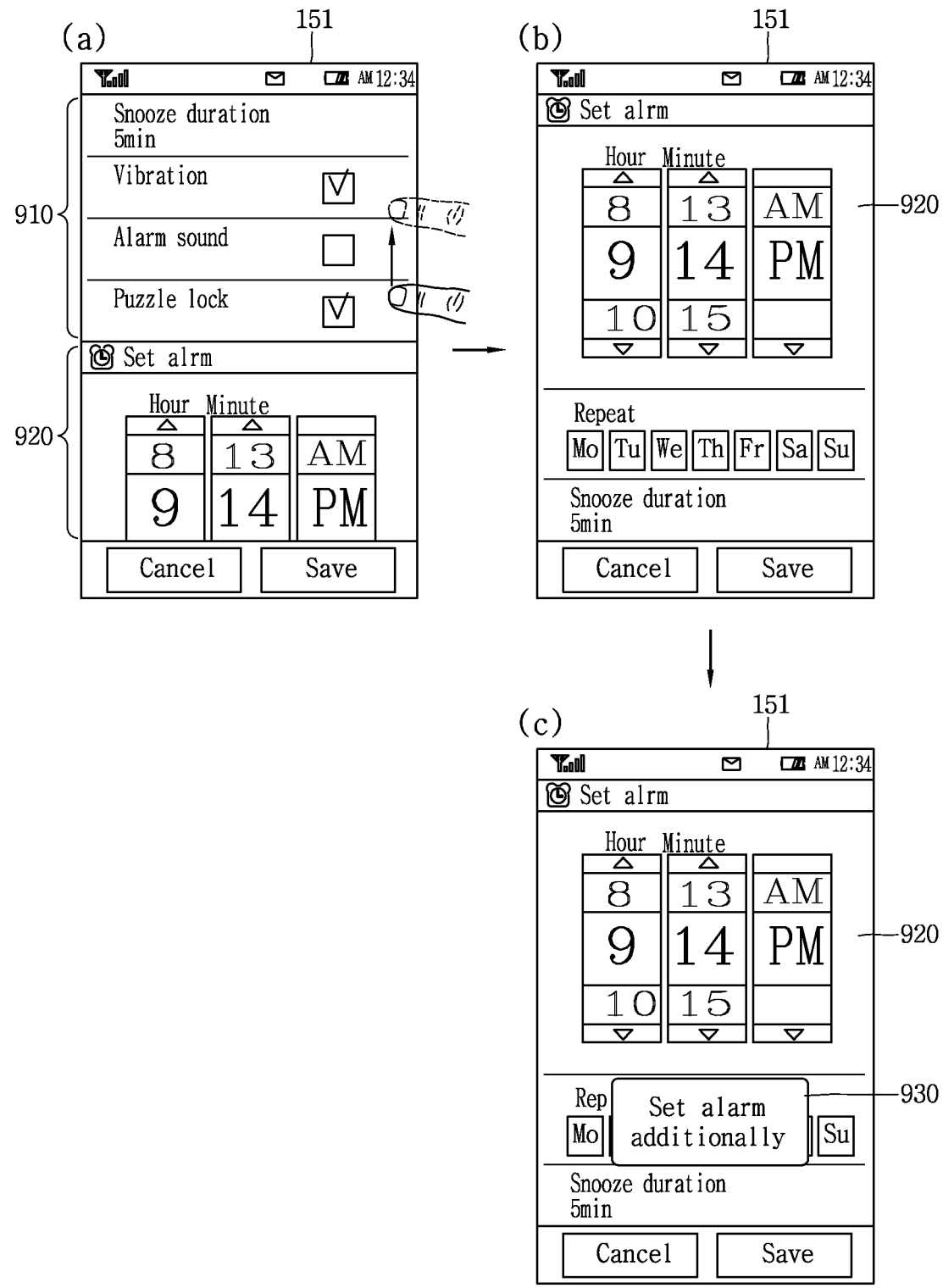

For another example, when the first page 910 displayed on the display unit 151 is an alarm setting screen as illustrated in FIG. 9B(a), the controller 180 may move the first page 910 according to a touch (for example, drag touch or flicking touch) corresponding to a predetermined scheme to the display unit 151. Furthermore, when a touch for moving the first page 910 is applied in a state that an edge region of the first page 910 is displayed as illustrated in FIG. 9B(b), the controller 180 may display the region 920 beyond the edge, and display another alarm setting screen for newly setting an alarm in the region 920 beyond the edge. Furthermore, the controller 180 may switch an alarm setting screen corresponding to the first page to a new alarm setting screen based on a touch to the display unit 151 as illustrated in FIG. 9B(d). Furthermore, in this case, the controller 180 may display guide information for guiding a new alarm to be set through a popup window 930 as illustrated in FIG. 9C(c). Furthermore, the guide information may be also output through a vibration or sound.

Figure 10A:
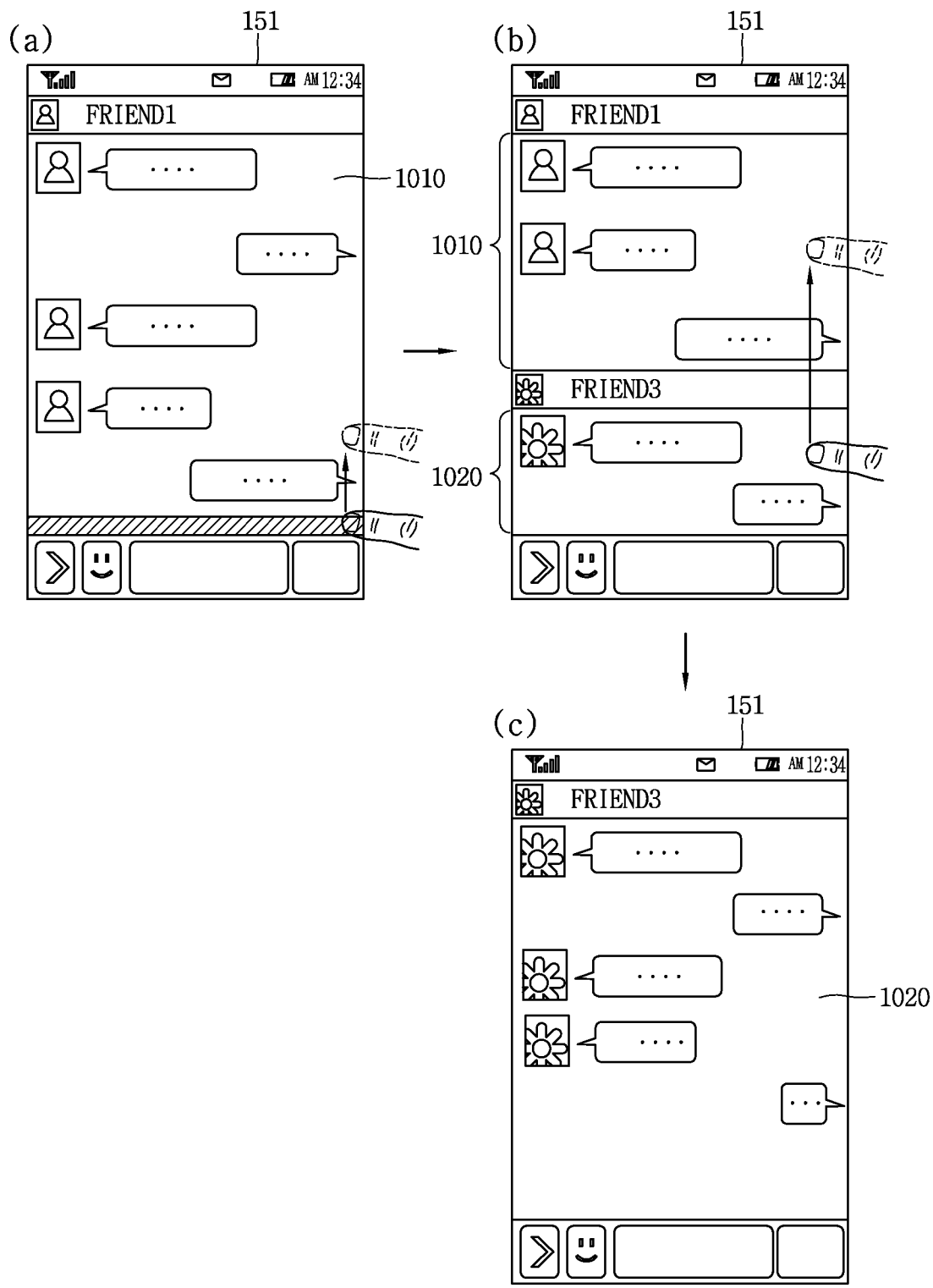
Figure 11:
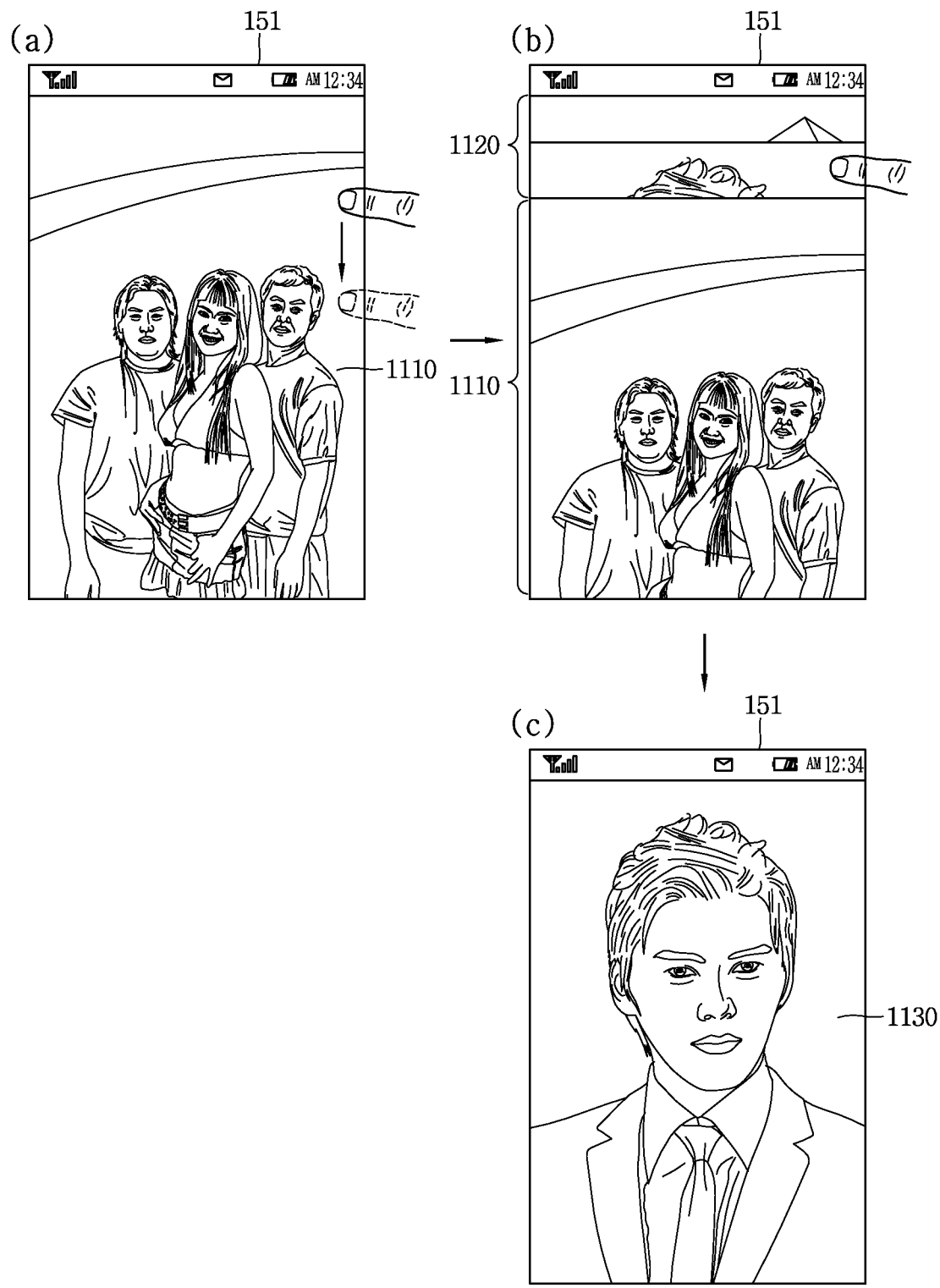
Figure 12:
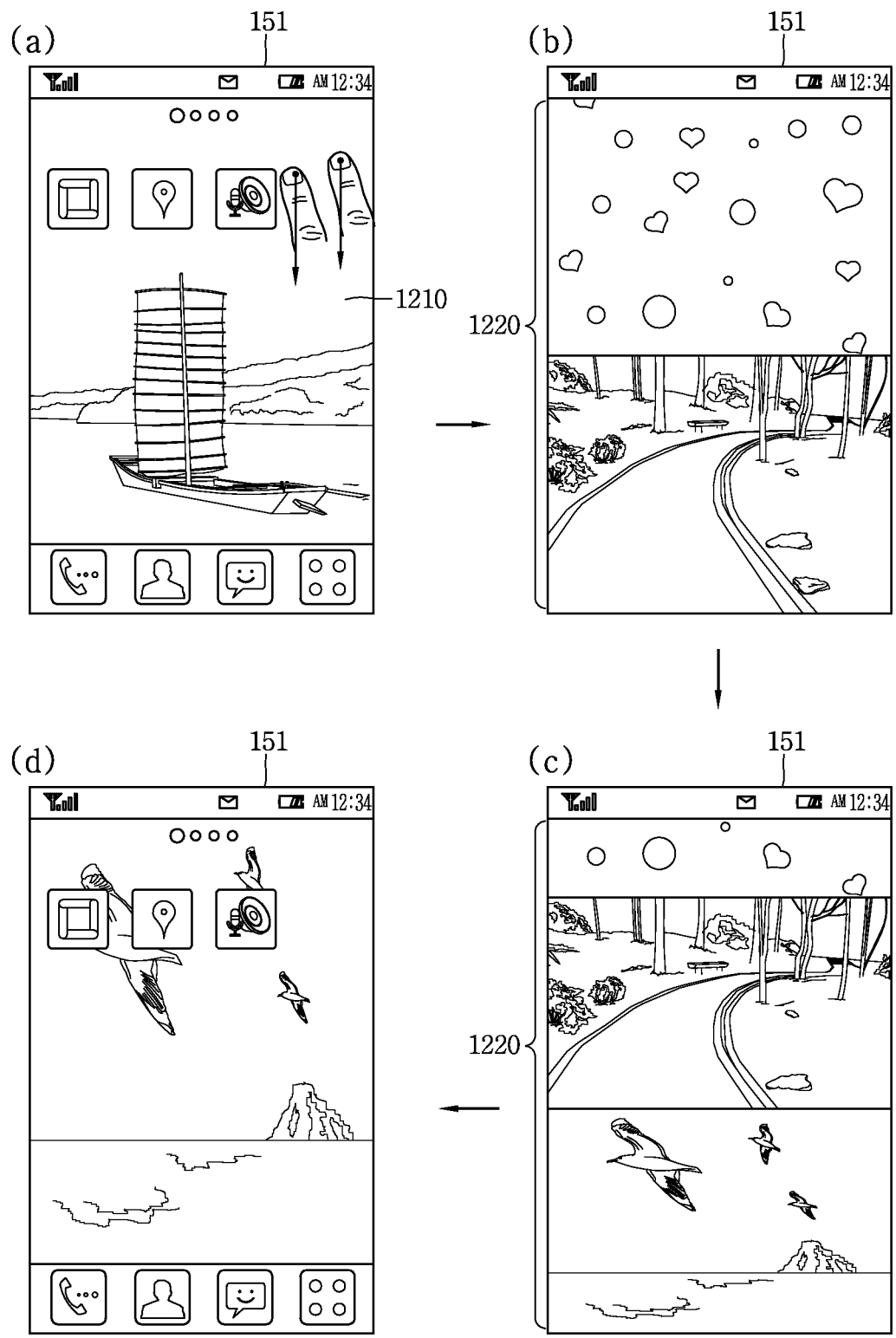
Figure 13:
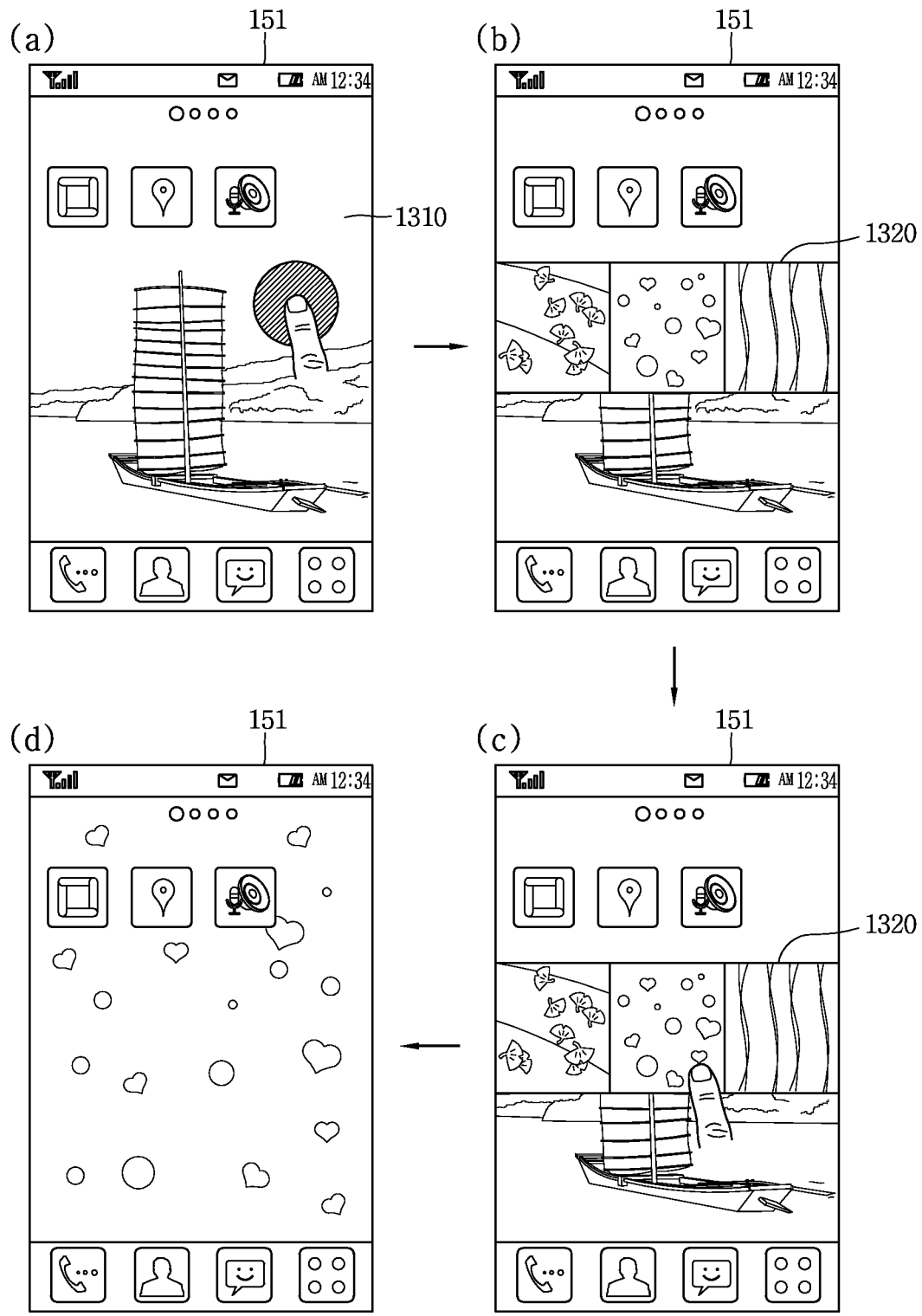
Figure 14:
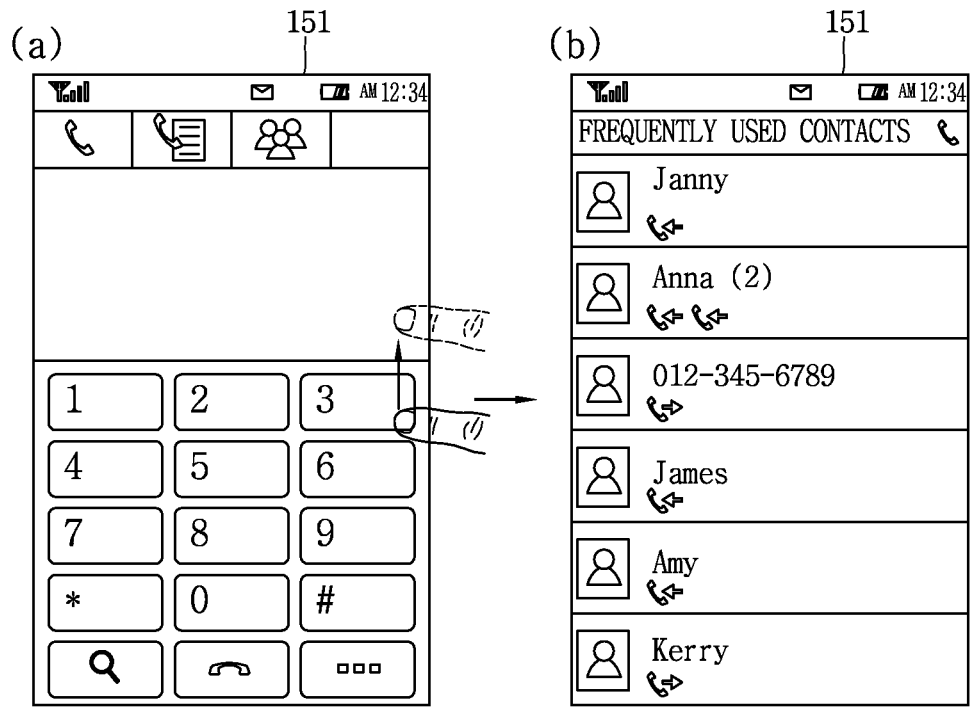

For another example, when the first page 1010 displayed on the display unit 151 is a message screen (or messenger screen, a chatting screen, a messenger conversation screen with a first recipient) as illustrated in FIG. 10A(a), the controller 180 may move the first page 1010 according to a touch (for example, drag touch or flicking touch) corresponding to a predetermined scheme being applied to the display unit 151. Furthermore, when a touch for moving the first page 1010 is applied in a state that an edge region of the first page 1010 is displayed as illustrated in FIG. 10A(a), the controller 180 may display a region 1020 beyond the edge, and display a messenger conversation screen with a second recipient who is different from the first recipient in the region 1020 beyond the edge as illustrated in FIG. 10A(b). Furthermore, the controller 180 may switch a messenger conversation screen corresponding to the first page to a messenger conversation screen with the second recipient based on a touch to the display unit 151 as illustrated in FIG. 10A(c).

For still another example, the controller 180 may display any one of another chatting window list, an incoming message list and an outgoing message list in the region 1020 beyond the edge as illustrated in FIG. 10B(b). Furthermore, when any one item is selected on the list, the controller 180 may display screen information 1030 corresponding to the selected item as illustrated in FIG. 10B(c).

For yet still another example, as illustrated in FIG. 11A, when the screen information of the first page 1110 displayed on the display unit 151 is a first image contained in the photo album, the controller 180 may display at least another image contained in the photo album in a region beyond the edge of the first page 1110 according to a touch (for example, drag touch or flicking touch) corresponding to a predetermined scheme being applied to the display unit 151. In addition, when an image displayed in the region beyond the edge is selected, the controller 180 may display the selected image as a whole on the display unit 151 as illustrated in FIG. 11C.

For still yet another example, as illustrated in FIG. 12A, when the first page 1210 displayed on the display unit 151 is a standby screen or home screen page, the controller 180 may display a list 1220 containing at least image item for changing the background image of the standby screen or home screen page according to a touch corresponding to a predetermined scheme being applied to the display unit 151 as illustrated in FIG. 12B. Furthermore, when any one item is selected from the list as illustrated in FIG. 12C, the controller 180 may change the background image of the standby screen or home screen page to an image corresponding to the selected item as illustrated in FIG. 12D.

Furthermore, as illustrated in FIG. 13B, the controller 180 may display a list 1320 containing at least one image item to be overlapped with a page displayed with the standby screen (or home screen page 1310). Meanwhile, here, a touch corresponding to the predetermined scheme may be a long touch input.

On the other hand, as described above, a region beyond the edge of the page may correspond to at least another page associated with the currently displayed page. The associated at least another page may be a page for performing a function similar to the currently displayed page.

For example, when the currently displayed page is a dial screen for making an outgoing call as illustrated in FIG. 14A, the at least another page may be a page corresponding to the frequently used call list or a page corresponding to the recent call list or a page corresponding to the favorite contact list as illustrated in FIG. 14B.

Figure 15:
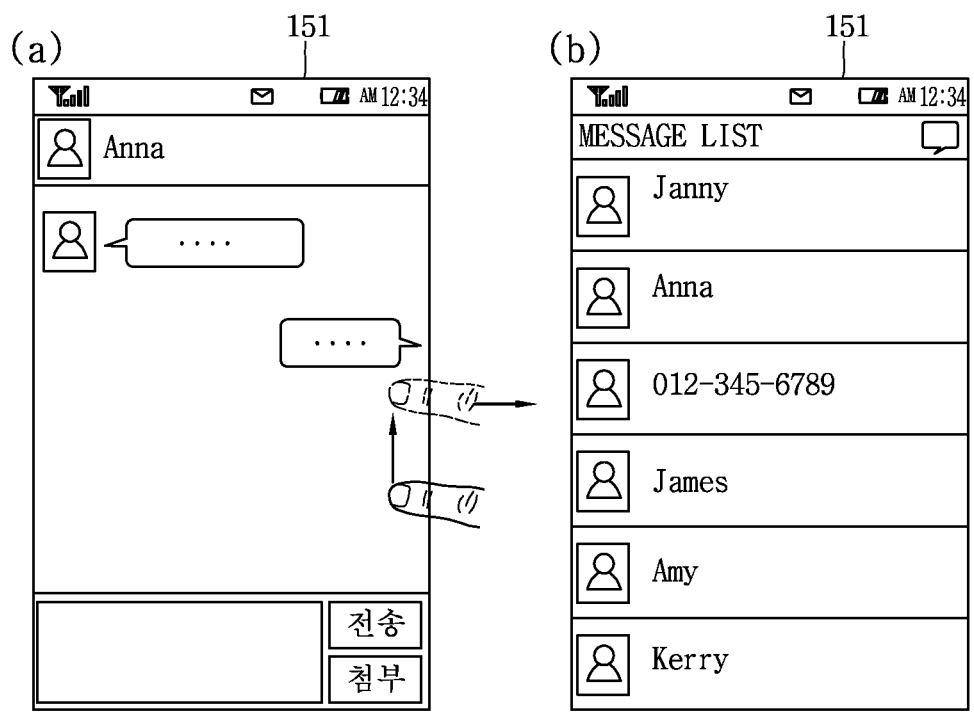

In addition, when the currently displayed page is a messenger conversation screen with a first recipient as illustrated in FIG. 15A, at least another page may be an incoming message list screen, an outgoing message list screen or a messenger conversation screen with at least one recipient who is different from the first recipient as illustrated in FIG. 15B.

Figure 16:
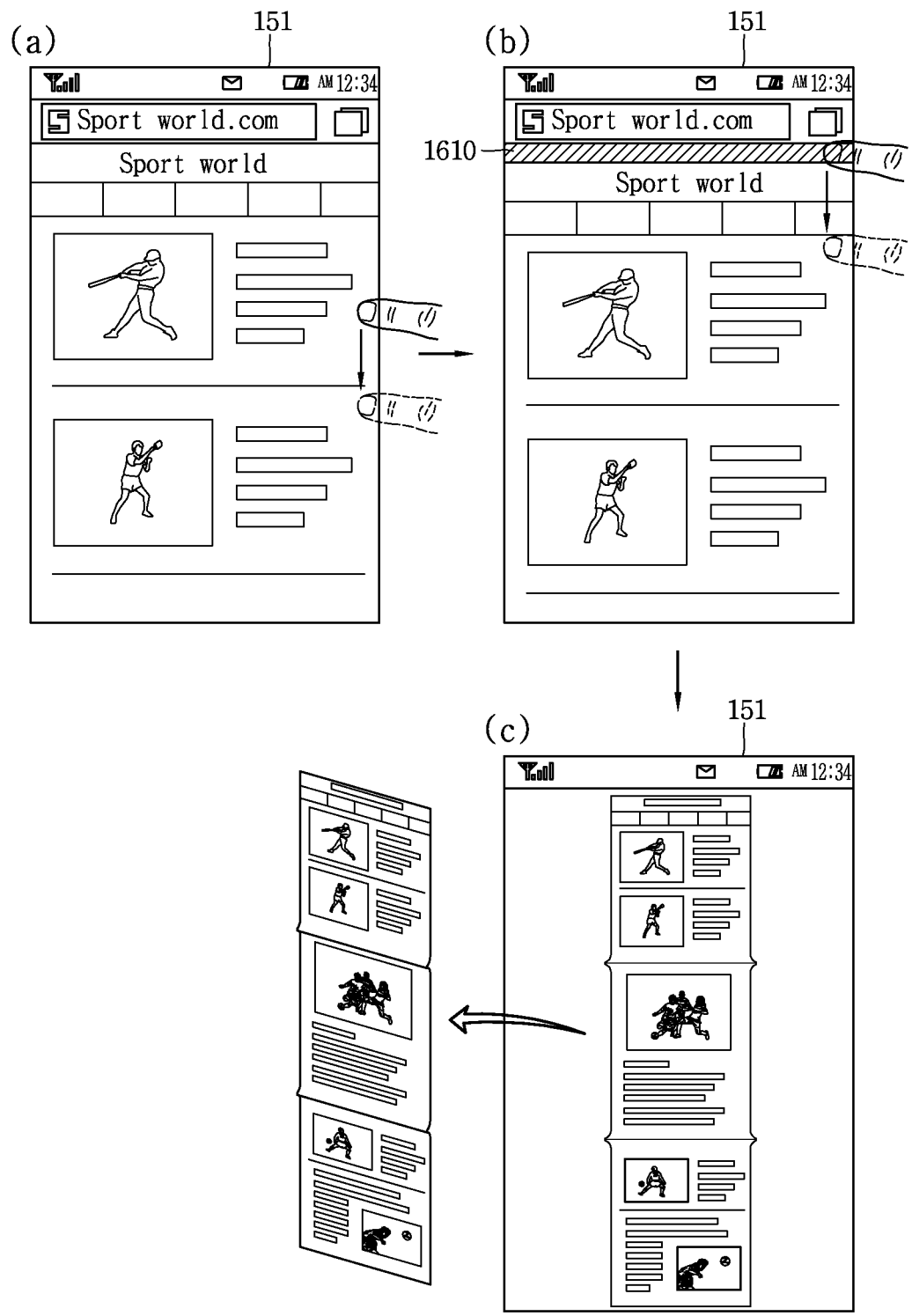
FIGS. 16 and 17 are conceptual views for explaining a method of displaying a plurality of pages in a mobile terminal according to an embodiment of the present disclosure.

On the other hand, in a mobile terminal according to an embodiment of the present disclosure, a page consecutive to the currently displayed page may be continuously displayed. For example, when a touch with a predetermined scheme, for example, a flicking touch, is applied to the display unit as illustrated in FIG. 16A, the controller 180 may display a graphic object 1610 as illustrated in FIG. 16B. Furthermore, when a touch is applied to the graphic object 1610 again, the controller 180 may continuously display at least one page associated with the currently displayed page (or a page that has been displayed on the display unit 151 prior to applying the touch) as illustrated in FIG. 16C.

On the other hand, at least another page associated with the currently displayed page may be continuously displayed at once as illustrated in FIG. 16C without displaying the graphic object as illustrated in FIG. 16B. On the other hand, in this case, the controller 180 may display a plurality of pages in a reduced size as illustrated in the drawing. Furthermore, the controller 180 may provide an animation effect on a boundary between each page to divide the boundary between each page as part of FIG. 16C is displayed in an enlarged manner.

Figure 17:
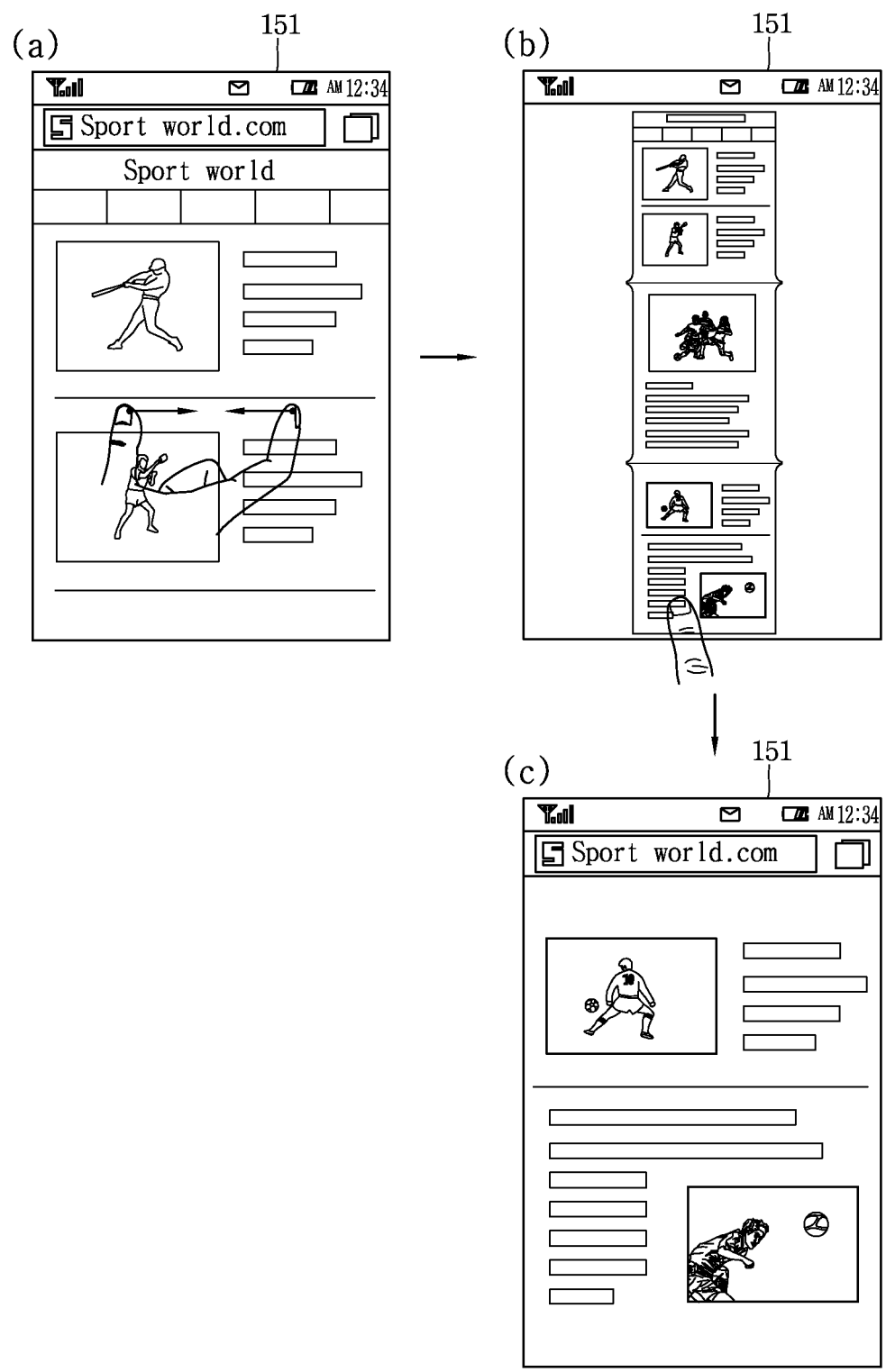

On the other hand, as illustrated in FIG. 16C, a touch with a predetermined scheme for displaying a plurality of pages at once may be a touch with a pinch-in gesture as illustrated in FIG. 17A. Meanwhile, when any one page is selected based on the touch in a state that a plurality of pages are displayed as illustrated in FIG. 17B, the controller 180 may display the selected any one page as a whole on the display unit 151 as illustrated in FIG. 17C.

On the other hand, according to the foregoing embodiments, a method of generating a control command for displaying information associated with a page currently displayed on the display unit based on a touch to the display unit 151 has been described. However, a mobile terminal according to an embodiment of the present disclosure may receive the control command using at least one of various sensors provided in the mobile terminal 100 other than the touch to the display unit 151.

For example, as illustrated in FIG. 2C, in case where a mobile terminal includes a curved surface shaped body and display, when the mobile terminal body is swung in response to a physical force applied to one region of the mobile terminal body, the controller 180 may recognize it as a control command. In other words, when the mobile terminal body is tilted up or down, the controller 180 may recognize it as a control command. Moreover, the controller 180 may control the display unit 151 such that the amount of information displayed in a region beyond the edge of the page displayed on the display unit varies according to the extent at which the mobile terminal body is tilted.

Figure 18:
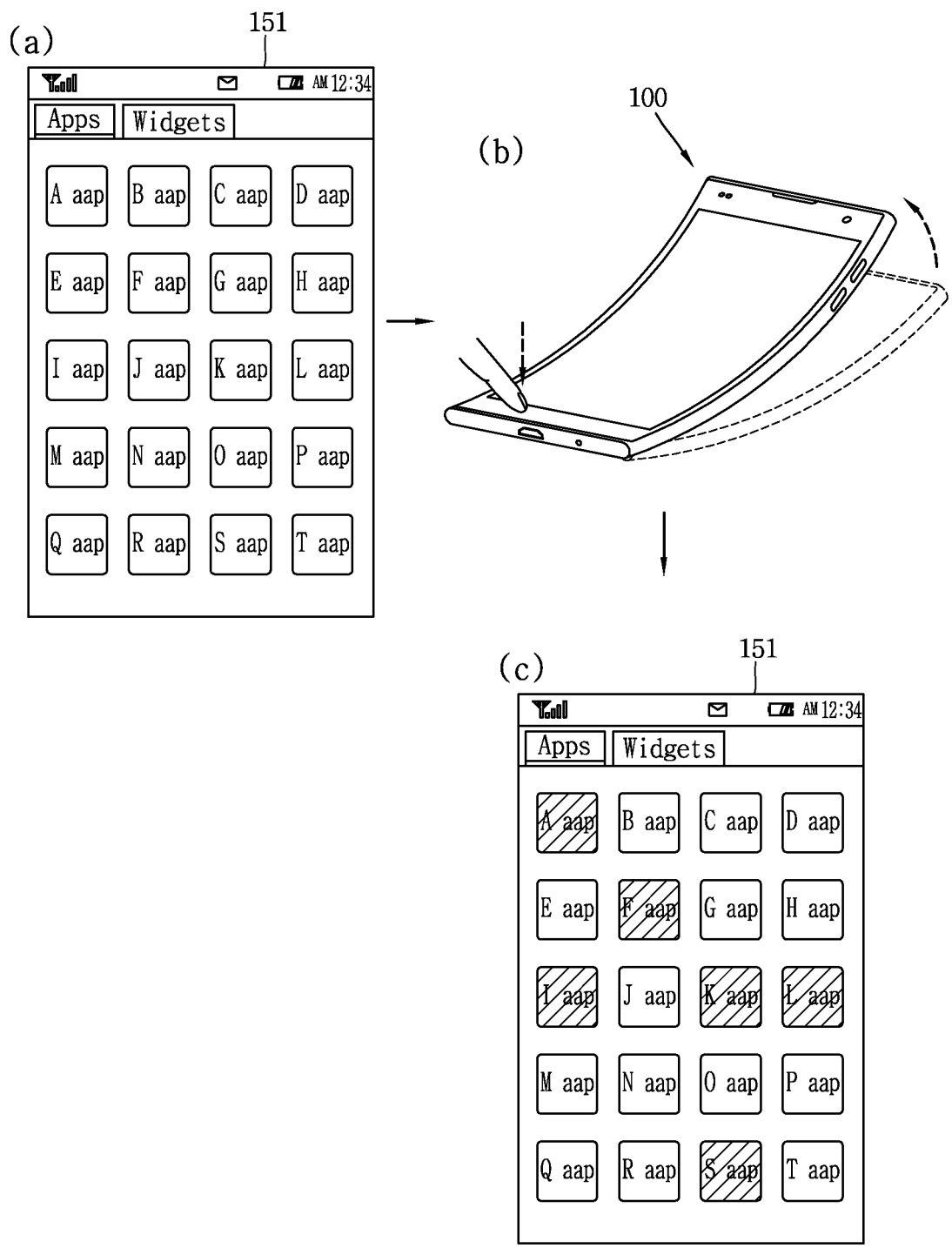
FIGS. 18 and 19 are conceptual views for explaining a method of receiving a control command for providing information associated with a currently displayed page in a mobile terminal according to an embodiment of the present disclosure.

Furthermore, for another example, when the mobile terminal body is tilted up or down as illustrated in FIG. 18B in a state that items are displayed as illustrated in FIG. 18A, the controller 180 may extract at least one item corresponding to a predetermined condition from the items, and display it to be distinguished from the other items as illustrated in FIG. 18C. Here, the items may be icons for applications, and when the mobile terminal body is tilted up or down, the controller 180 may display the icon of a frequently used application to be distinguished from the other icons.

Figure 19:
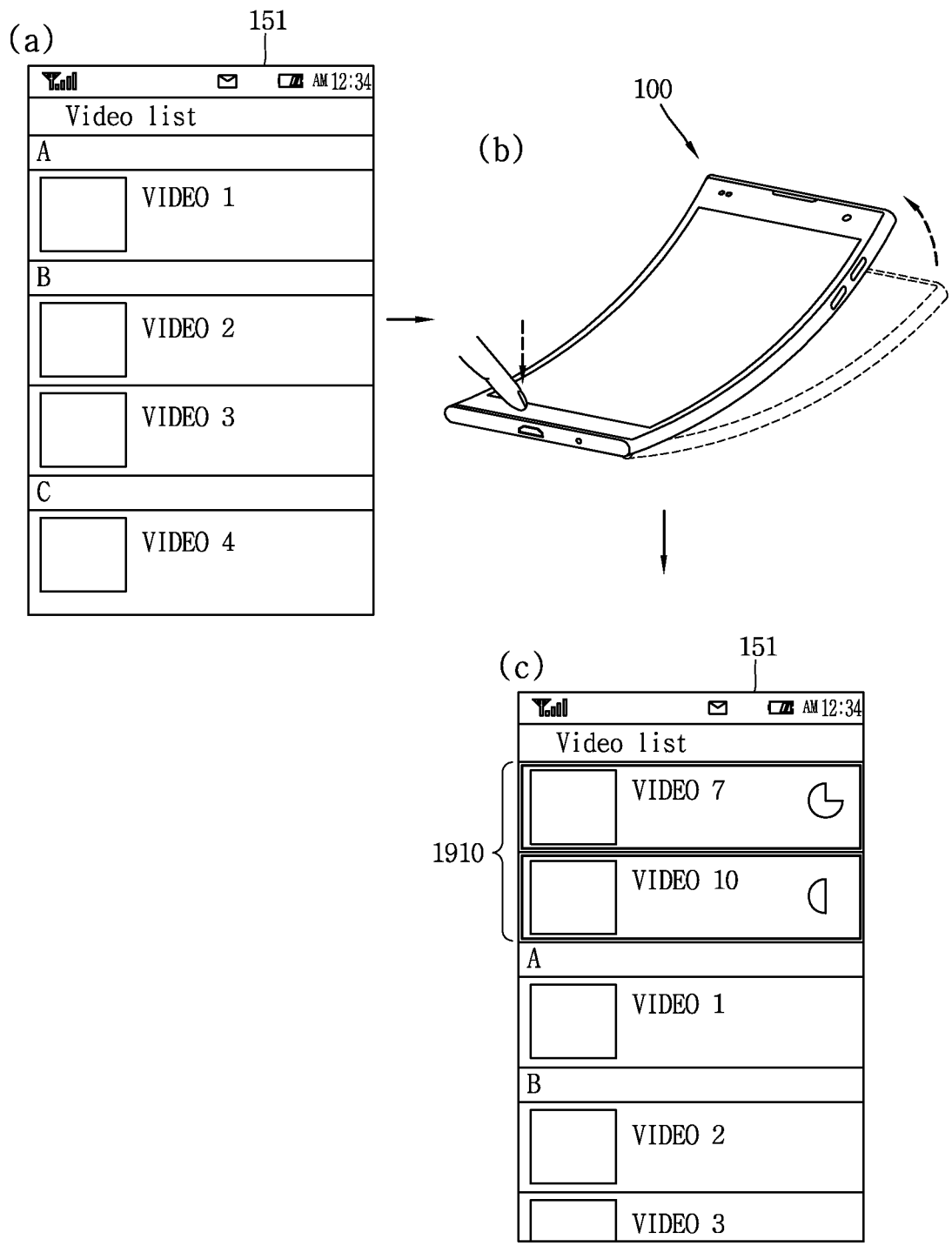

Furthermore, still another example, when the mobile terminal body is tilted up or down in a state that a list containing items corresponding to video files are displayed as illustrated in FIG. 19A, the controller 180 may display at least one item corresponding to a video file for which play is not completed in at least one region 1910 of the display unit 151 as illustrated in FIG. 19C.

As described above, in a mobile terminal according to an embodiment of the present disclosure and a control method thereof, information associated with currently displayed screen information may be displayed based on the mobile terminal body being tilted up or down. Furthermore, in a mobile terminal according to an embodiment of the present disclosure, at least one of whether or not the associated information is displayed or the displayed amount of information may be controlled according to a speed at which the mobile terminal body is tilted up or down.

Figure 20A:
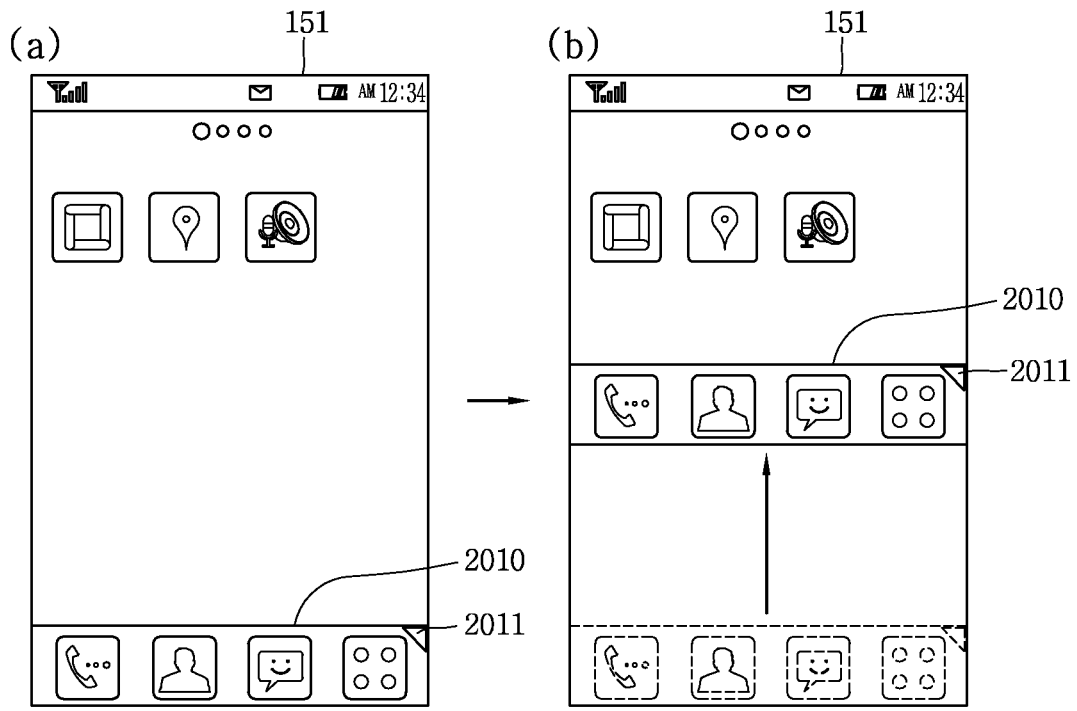
FIGS. 20A and 20B are conceptual views for explaining a standby screen in a mobile terminal according to an embodiment of the present disclosure.

On the other hand, in a mobile terminal according to an embodiment of the present disclosure, a fixed menu bar 2010 in which icons corresponding to predetermined applications are displayed in a fixed manner may be displayed in one region of the display unit 151 based on the user's selection or controller 180 as illustrated in FIG. 20A(a). The fixed menu bar 2010 may be continuously displayed in a state that a standby screen or home screen page is displayed on the display unit 151. Furthermore, the fixed menu bar 2010 may be displayed according to circumstances even when an execution screen of the application is displayed on the display unit 151.

On the other hand, in a mobile terminal according to an embodiment of the present disclosure, the fixed menu bar 2010 may be moved to the user's desired location, thereby allowing the user to use the fixed menu bar 2010 in a convenient manner. For example, in a mobile terminal according to an embodiment of the present disclosure, a chat function icon 2011 may be separately provided in the fixed menu bar 2010, thereby allowing the movement of the fixed menu bar 2010 when the function icon 2011 is selected. Accordingly, the fixed menu bar 2010 may be moved to the user's desired location as illustrated in FIG. 20A(b). Furthermore, the controller 180 may fix the fixed menu bar 2010 at the moved location again based on the selection of the function icon 2011. On the other hand, when the location of the fixed menu bar 2010 is changed, the fixed menu bar 2010 that has been displayed prior to changing the original location may not be displayed any more.

Figure 20B:
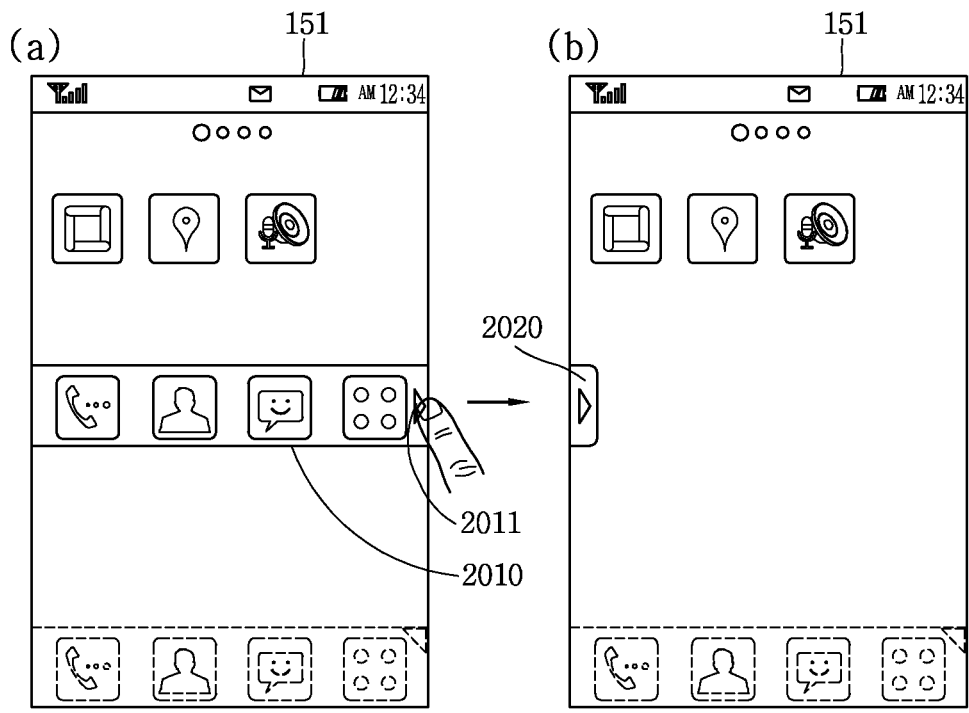

Moreover, in a mobile terminal according to an embodiment of the present disclosure, the fixed menu bar 2010 may be minimized based on the fixed menu bar 2010 being dragged or flicked in one direction as illustrated in FIGS. 20B(a) and 20B(b). In this case, a graphic object 2020 indicating that the fixed menu bar 2010 has been minimized may be displayed on the display unit. Meanwhile, when any one of a short touch, a long touch, a drag touch and a flick touch is applied to the graphic object 2020, the minimized fixed menu bar 2010 can be displayed again on the display unit 151.

As described above, a mobile terminal according to an embodiment of the present disclosure and a control method thereof may provide a graphic object corresponding to another screen information associated with screen information displayed on the display unit to the user along with the displayed screen information, thereby allowing the user to more quickly access the screen information associated with the displayed screen information.

Moreover, a mobile terminal according to an embodiment of the present disclosure and a control method thereof may display screen information for performing a function similar to screen information displayed on the display unit along with the displayed screen information. Accordingly, when the user wants to additionally execute a function similar to the currently displayed screen information, the user can intuitively move to a screen for performing the similar function.

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:
1. A mobile terminal, comprising:
   a touch screen; and
   a controller configured to:
      cause the touch screen to display a first chat screen associated with a first party, of a plurality of parties, wherein the first chat screen includes a plurality of chat items;
      receive, via the touch screen, a touch corresponding to a predetermined scheme for scrolling;
      scroll the plurality of chat items of the first chat screen in response to the touch;
      cause the touch screen to display a graphic object, after displaying a last chat item of the plurality of chat items;
      divide a display area of the touch screen into a first region and a second region, in response to a first input being received during the displaying of the graphic object;
      cause the touch screen to stop displaying the graphic object, after the first input is received;
      cause the touch screen to display the first chat screen with only a portion of the plurality of chat items within the first region, after the first input is received;
      cause the touch screen to display identifiers of respective other parties, from among the plurality of parties, within the second region and after the first input is received;
      cause the touch screen to display a second chat screen associated with a second party of the other parties, in response to receiving a second input with regard to the displayed identifier of the second party, wherein the second chat screen includes a plurality of chat items associated with the second party; and
      cause the touch screen to stop the displaying of the first chat screen within the first region, in further response to the receiving the second input with regard to the displayed identifier of the second party.
2. The mobile terminal of claim 1, wherein the controller is further configured to control the touch screen to vary a size of the plurality of chat items of the first chat screen based on a location of the displayed plurality of chat items.
3. The mobile terminal of claim 2, wherein the controller is further configured to control the touch screen to enlarge an item of the plurality of chat items that is closest to an edge of the first chat screen such that the enlarged item is displayed larger than other items of the plurality of chat items of the first chat screen.
4. The mobile terminal of claim 2, wherein the controller is further configured to control the touch screen to enlarge an item of the plurality of chat items of the first chat screen that is located at a predetermined reference line of the touch screen such that the enlarged item is displayed larger than other items of the plurality of chat items of the first chat screen.
5. The mobile terminal of claim 1, wherein the controller is further configured to:
   control the touch screen to change a display size of an item of the plurality of chat items of the first chat screen based on a pinch-in or pinch-out gesture received on the item; and adjust a size of a region in which the portion of the first plurality of chat items of the first chat screen is displayed, the size adjusted based on the changing of the size of the item.

6. The mobile terminal of claim 1, wherein the controller is further configured to:
cause the touch screen to display the graphic object as a result of the scroll the plurality of chat items.

7. The mobile terminal of claim 1, wherein the graphic object is displayed adjacent to an end region of the first chat screen.

8. The mobile terminal of claim 1, wherein the graphic object is displayed while the first chat screen is displayed.

9. The mobile terminal of claim 1, wherein the portion of the plurality of chat items within the first region include chronologically last chat items of the plurality of chat items.

10. The mobile terminal of claim 1, wherein the controller is further configured to:
cause the touch screen to stop the displaying of the identifiers of the other parties, except for the identifier of the second party, in further response to the receiving the second input with regard to the displayed identifier of the second party.

11. A control method for a mobile terminal having a touch screen, the method comprising:
displaying, on the touch screen, a first chat screen associated with a first party, of a plurality of parties, wherein the first chat screen includes a plurality of chat items;
receiving, via the touch screen, a touch corresponding to a predetermined scheme for scrolling;
scrolling the plurality of chat items of the first chat screen in response to the touch;
displaying, on the touch screen, a graphic object, after displaying a last chat item of the plurality of chat items;
dividing a display area of the touch screen into a first region and a second region, in response to first input being received during the displaying of the graphic object;
stopping the displaying the graphic object, after the first input is received;
displaying, on the touch screen, the first chat screen with only a portion of the plurality of chat items within the first region, after the first input is received;
displaying, on the touch screen, identifiers of respective other parties, from among the plurality of parties, within the second region and after the first input is received;
displaying, on the touch screen, a second chat screen associated with a second party of the other parties, in response to receiving a second input with regard to the displayed identifier of the second party, wherein the second chat screen includes a plurality of chat items associated with the second party; and
stopping the displaying of the first chat screen within the first region, in further response to the receiving the second input with regard to the displayed identifier of the second party.

12. The method of claim 11, further comprising:
displaying, on the touch screen, the graphic object as a result of the scroll the plurality of chat items.

13. The method of claim 11, wherein the graphic object is displayed adjacent an end region of the first chat screen.

14. The method of claim 11, wherein the graphic object is displayed while the first chat screen is displayed.

15. The method of claim 11, wherein the portion of the plurality of chat items within the first region include chronologically last chat items of the plurality of chat items.

16. The method of claim 11, further comprising:
stopping the displaying of the identifiers of the other parties, except for the identifier of the second party, in further response to the receiving the second input with regard to the displayed identifier of the second party.

* * * * *